US012619096B2

(12) United States Patent
Zou et al.

(10) Patent No.: US 12,619,096 B2
(45) Date of Patent: May 5, 2026

(54) DISPLAY APPARATUS, SYSTEM, AND METHOD

(71) Applicant: Shenzhen Yinwang Intelligent Technologies Co., Ltd., Shenzhen (CN)

(72) Inventors: Bing Zou, Shenzhen (CN); Zhiyong Feng, Dongguan (CN); Zhiyong Huang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 721 days.

(21) Appl. No.: 17/985,366

(22) Filed: Nov. 11, 2022

(65) Prior Publication Data

US 2023/0077212 A1      Mar. 9, 2023

Related U.S. Application Data

(63) Continuation of application No. PCT/CN2021/092082, filed on May 7, 2021.

(30) Foreign Application Priority Data

May 15, 2020      (CN) .......................... 202010422318.4

(51) Int. Cl.
*G02B 30/50*            (2020.01)
(52) U.S. Cl.
CPC .................................... *G02B 30/50* (2020.01)
(58) Field of Classification Search
CPC .......... G02B 30/50; G02B 3/14; G02B 30/52; G02B 30/54; G02B 27/01; H04N 13/395; H04N 13/302
See application file for complete search history.

(56) References Cited

U.S. PATENT DOCUMENTS 10,088,685  B1 *  10/2018  Aharoni ............... G02B 6/0076
10,775,740  B2 *   9/2020  Rakshit ................ G03H 1/2249
(Continued)

FOREIGN PATENT DOCUMENTS

CN          101588510 A      11/2009
CN          102354068 A       2/2012
(Continued)

*Primary Examiner* — Nathan J Flynn
*Assistant Examiner* — Christine A Kurien
(74) *Attorney, Agent, or Firm* — Leydig, Voit & Mayer, Ltd.

(57)            ABSTRACT

A display apparatus and method are provided. The display apparatus includes a multi-focus image generation unit and a time sequence control unit. The multi-focus image generation unit is connected to the time sequence control unit. The time sequence control unit is configured to: generate a plurality of time sequence instructions that belong to a first switching period, and send the plurality of time sequence instructions that belong to the first switching period. The multi-focus image generation unit is configured to: receive the plurality of time sequence instructions that belong to the first switching period from the time sequence control unit, and generate a plurality of corresponding 3D image blocks at different distances based on the plurality of time sequence instructions. The plurality of 3D image blocks respectively corresponds to a 3D image and include different depth information for display in the first switching period.

24 Claims, 12 Drawing Sheets

(56)         References Cited

U.S. PATENT DOCUMENTS

| | | |
|---|---|---|
| 2008/0252556 A1 | 10/2008 | Tseng et al. |
| 2014/0009590 A1* | 1/2014 | Jiang .................... H04N 13/356 |
| | | 348/57 |
| 2015/0015685 A1 | 1/2015 | Muller |
| 2016/0147081 A1 | 5/2016 | Kilcher et al. |
| 2020/0045302 A1 | 2/2020 | Osmanis et al. |

FOREIGN PATENT DOCUMENTS

| | | |
|---|---|---|
| CN | 103918257 A | 7/2014 |
| CN | 104246574 A | 12/2014 |
| CN | 104394396 A | 3/2015 |
| CN | 106233189 A | 12/2016 |
| CN | 106371222 A | 2/2017 |
| CN | 106461955 A | 2/2017 |
| CN | 106842597 A | 6/2017 |
| CN | 107065124 A | 8/2017 |
| CN | 109143576 A | 1/2019 |
| CN | 109212771 A | 1/2019 |
| CN | 109633905 A | 4/2019 |
| CN | 109831661 A | 5/2019 |
| CN | 110109260 A | 8/2019 |
| CN | 110308566 A | 10/2019 |
| CN | 111133366 A | 5/2020 |
| EP | 3099076 A1 | 11/2016 |
| GB | 2526275 B | 12/2017 |
| JP | H09243960 A | 9/1997 |
| JP | 2002139700 A | 5/2002 |
| JP | 2019127065 A | 8/2019 |

* cited by examiner

Phase information loaded on an SLM

SLM

DISPLAY APPARATUS, SYSTEM, AND METHOD

CROSS-REFERENCE TO RELATED APPLICATIONS

This application is a continuation of International Application No. PCT/CN2021/092082 filed on May 7, 2021, which claims priority to Chinese Patent Application No. 202010422318.4 filed on May 15, 2020. The disclosures of the aforementioned applications are hereby incorporated by reference in their entireties.

TECHNICAL FIELD

This disclosure relates to the field of image processing and display, and in particular, to a display apparatus, system, and method.

BACKGROUND

In an image display scenario, three dimensional (3D) display can provide a more real image to a viewer than two dimensional (2D) display. Currently, the viewer needs to wear an auxiliary device such as special glasses or a helmet while watching a common 3D movie or 3D television in the market. Viewing images of a left eye and a right eye are separated by using the auxiliary device, so that a brain of a user can combine a stereoscopic image with a feeling of depth, thereby generating a stereoscopic 3D movie viewing effect. A naked-eye 3D technology can control a display to generate different image sources to the left eye and the right eye of the viewer without requiring the user to wear the auxiliary device, thereby generating a 3D viewing effect.

In a naked-eye 3D technology based on binocular parallax, because of a vision difference between the left eye and the right eye, different areas of a display panel can be respectively viewed by the left eye and the right eye within a specific observation range and at a specific observation angle, and visual images of the left eye and the right eye of the viewer are separated, that is, images that simultaneously enter the two eyes of the user are different. The display panel separately displays corresponding image sources in viewing ranges of the left eye and the right eye, and a 3D display effect is implemented by using corresponding depth information that is generated by processing of a human brain.

The image sources seen by the left eye and the right eye are still 2D image sources, and the 3D movie viewing effect originates from a difference between two 2D images that is perceived by the human brain. Focuses of the human eyes are still on one plane, and are not at different distances like actually viewing a 3D object in reality, and focal lengths of the human eyes also have a relative distance. Therefore, real depth information cannot be generated, and a problem of a poor 3D display effect exists. In addition, the display panel separates the left eye and the right eye by dividing an area. Therefore, a problem that a final display image resolution is low exists.

SUMMARY

Embodiments of this disclosure provide a display apparatus, system, and method, where a 3D image is displayed based on real depth information, so as to improve a display effect of the 3D image and a resolution of the 3D image.

To resolve the foregoing technical problems, the embodiments of this disclosure provide the following technical solutions:

According to a first aspect, an embodiment provides a display apparatus, including a multi-focus image generation unit and a time sequence control unit. The multi-focus image generation unit is connected to the time sequence control unit. The time sequence control unit is configured to generate a plurality of time sequence instructions that belong to a first switching period, and send the plurality of time sequence instructions that belong to the first switching period. The multi-focus image generation unit is configured to receive the plurality of time sequence instructions that belong to the first switching period from the time sequence control unit, and generate a plurality of corresponding three-dimensional (3D) image blocks at different distances based on the plurality of time sequence instructions, where the plurality of 3D image blocks respectively have different depth information, and the plurality of 3D image blocks belong to a 3D image for display in the first switching period. The display apparatus provided in this embodiment of this application includes a multi-focus image generation unit, where the multi-focus image generation unit may generate a plurality of 3D image blocks with depth information based on time sequence control. Therefore, a 3D image formed by the apparatus has real depth distribution, and a display effect of the 3D image is better than that of a 3D technology based on 2D binocular parallax. In addition, in this embodiment of this application, the 3D image block is generated by the apparatus only based on time sequence control, and a resolution of an image source is not reduced. Therefore, a resolution of the 3D image is better than an image resolution of the 3D technology based on 2D binocular parallax.

In a possible implementation, the time sequence control unit is further configured to generate a plurality of time sequence instructions that belong to a second switching period, and sends the plurality of time sequence instructions that belong to the second switching period. The multi-focus image generation unit is configured to receive the plurality of time sequence instructions that belong to the second switching period from the time sequence control unit, and generate a plurality of corresponding 3D image blocks at different distances based on the plurality of time sequence instructions that belong to the second switching period, where the plurality of 3D image blocks that belong to the second switching period respectively have different depth information, and the plurality of 3D image blocks that belong to the second switching period belong to a 3D image for display in the second switching period. The time sequence control unit may further generate time sequence instructions of more switching periods. Therefore, in each switching period, the multi-focus image generation unit may generate a plurality of 3D image blocks, and the plurality of 3D image blocks respectively have different depth information, so that the plurality of 3D image blocks can constitute a 3D image for display in one switching period. After one 3D image is displayed in one switching period, one next generated 3D image may be further displayed in one next switching period, so that a plurality of 3D images can be cyclically displayed, thereby implementing a naked-eye 3D display effect.

In a possible implementation, the plurality of time sequence instructions that belong to the first switching period include a first time sequence instruction and a second time sequence instruction. The multi-focus image generation unit is configured to receive the first time sequence instruction, and generates a corresponding first 3D image block at a first distance based on the first time sequence instruction; and receives the second time sequence instruction, and generates a corresponding second 3D image block at a second distance based on the second time sequence instruction. The first 3D image block and the second 3D image block respectively have different depth information, and the first 3D image block and the second 3D image block belong to the 3D image for display in the first switching period. In this embodiment, the multi-focus image generation unit generates a plurality of 3D image blocks, where the plurality of 3D image blocks respectively have different depth information, so that the plurality of 3D image blocks can constitute the 3D image for display in the first switching period. Therefore, the 3D image generated in this embodiment has real depth information, thereby improving the naked-eye 3D display effect.

In a possible implementation, the multi-focus image generation unit includes a fixed-focus assembly. The fixed-focus assembly is configured to receive the plurality of time sequence instructions that belong to the first switching period from the time sequence control unit; and change a distance from an object to the fixed-focus assembly for a plurality of times based on the plurality of time sequence instructions that belong to the first switching period, and generate a plurality of corresponding 3D image blocks when changing the distance from the object to the fixed-focus assembly for a plurality of times. In this embodiment, the multi-focus image generation unit may be implemented by using the fixed-focus assembly, and the fixed-focus assembly may generate a plurality of 3D image blocks, where the plurality of 3D image blocks respectively have different depth information, so that the plurality of 3D image blocks can constitute the 3D image for display in the first switching period. Therefore, the 3D image generated in this embodiment has real depth information, thereby improving the naked-eye 3D display effect.

In a possible implementation, the multi-focus image generation unit includes a zoom assembly. The zoom assembly is configured to receive the plurality of time sequence instructions that belong to the first switching period from the time sequence control unit; and change a focal length of the zoom assembly for a plurality of times based on the plurality of time sequence instructions that belong to the first switching period, and generate a plurality of corresponding 3D image blocks when changing the focal length of the zoom assembly for a plurality of times. In this embodiment of this application, the multi-focus image generation unit may be implemented by using the zoom assembly, and the zoom assembly may generate a plurality of 3D image blocks, where the plurality of 3D image blocks respectively have different depth information, so that the plurality of 3D image blocks can constitute the 3D image for display in the first switching period. Therefore, the 3D image generated in this embodiment has real depth information, thereby improving the naked-eye 3D display effect.

In a possible implementation, the multi-focus image generation unit includes a spatial light modulator. The spatial light modulator is configured to receive the plurality of time sequence instructions that belong to the first switching period from the time sequence control unit; and load different spatial phase information for a plurality of times based on the plurality of time sequence instructions that belong to the first switching period, and generate a plurality of corresponding 3D image blocks when loading the different spatial phase information for a plurality of times. In this embodiment of this application, the multi-focus image generation unit 101 may be implemented by using the spatial light modulator, and the spatial light modulator may generate a plurality of 3D image blocks, where the plurality of 3D image blocks respectively have different depth information, so that the plurality of 3D image blocks can constitute the 3D image for display in the first switching period. Therefore, the 3D image generated in this embodiment has real depth information, thereby improving the naked-eye 3D display effect.

In a possible implementation, the display apparatus further includes a diffuser screen. The diffuser screen is separately connected to the multi-focus image generation unit and the time sequence control unit. The diffuser screen is configured to receive the plurality of time sequence instructions that belong to the first switching period from the time sequence control unit, and receive the plurality of 3D image blocks that belong to the first switching period from the multi-focus image generation unit; and display the 3D image in the first switching period based on the plurality of time sequence instructions that belong to the first switching period and the depth information respectively corresponding to the plurality of 3D image blocks that belong to the first switching period. The diffuser screen can receive an image generated by the multi-focus image generation unit, so that imaging is implemented on the diffuser screen, and a light beam is diverged, so that the image can be viewed by a human eye at a wider angle and position. In addition, a distance of the image received by the diffuser screen needs to change with a time sequence to match a distance of the image generated by the multi-focus image generation unit, so as to ensure that all images generated by the multi-focus image generation unit are at corresponding imaging distances, thereby ensuring imaging quality.

In a possible implementation, the diffuser screen includes a plurality of layers of diffuser sub-screens. The plurality of layers of diffuser sub-screens are configured to determine a diffuser sub-screen currently used for display from the plurality of layers of diffuser sub-screens based on a current time sequence instruction in the plurality of time sequence instructions that belong to the first switching period, and display a 3D image block corresponding to the current time sequence instruction by using the diffuser sub-screen currently used for display. The plurality of layers of diffuser sub-screens may include a plurality of layers of diffuser screen materials, and each layer of diffuser sub-screen may be controlled, by using power-on, to be transparent or function as a diffuser screen, and power-on information of each layer of diffuser sub-screen is controlled by using the time sequence instruction, so that the diffuser screen based on time sequence control can be implemented. In this embodiment, imaging of the 3D image with depth information can be implemented by using the plurality of layers of diffuser sub-screens, and has an imaging effect of a real 3D image.

In a possible implementation, the diffuser screen is configured to determine a current position of the diffuser screen based on a current time sequence instruction in the plurality of time sequence instructions that belong to the first switching period, and display a 3D image block corresponding to the current time sequence instruction at the current position. The diffuser screen may be implemented in a mechanical manner. A front and back movement of a single diffuser screen is mechanically controlled to match different distance requirements of a multi-focus image. A moving speed in a mechanical manner may be determined based on a specific application scenario. When a distance needs to be changed quickly in a large range, a moving speed of the diffuser screen may be accelerated. In this embodiment, imaging of a 3D image with depth information can be implemented by using the diffuser screen, and has an imaging effect of a real 3D image.

In a possible implementation, the display apparatus further includes an imaging unit. The imaging unit is configured to receive an optical signal transmitted by the diffuser screen, generate a virtual 3D image based on the optical signal, and send the virtual 3D image. The optical signal includes the 3D image for display in the first switching period. The imaging unit generates a virtual image corresponding to a formed real image, and projects the virtual image into the human eye, so that the corresponding virtual 3D image can be observed by the human eye, thereby implementing the naked-eye 3D display effect.

In a possible implementation, the display apparatus further includes a combiner. The combiner is configured to receive the virtual 3D image sent by the imaging unit; and combine the virtual 3D image with an image of a real object. The combiner may receive the virtual 3D image sent by the imaging unit 104, and with reference to a real scenario, may generate a virtual display 3D image based on the real scenario, thereby implementing a comprehensive display effect of the virtual display 3D image.

In a possible implementation, the display apparatus further includes a reflector. The reflector is configured to receive the virtual 3D image sent by the imaging unit; and reflect the virtual 3D image. The observer only sees a 3D virtual image just like a 3D display. Because the imaging unit generally has an enlarging function, a 3D image that is actually viewed is much larger than an area of the reflector, and therefore, an imaging area is larger.

According to a second aspect, an embodiment further provides a display system, including the display apparatus and the imaging unit of any one of the first aspect. The imaging unit is configured to receive an optical signal transmitted by the display apparatus, where the optical signal includes a 3D image displayed in a first switching period; and generate a virtual 3D image based on the optical signal, and send the virtual 3D image. The display apparatus provided in this embodiment of this application includes a multi-focus image generation unit, where the multi-focus image generation unit may generate a plurality of 3D image blocks with depth information based on time sequence control. Therefore, a 3D image formed by the apparatus has real depth distribution, and a display effect of the 3D image is better than that of a 3D technology based on 2D binocular parallax. In addition, in this embodiment, the 3D image block is generated by the apparatus only based on time sequence control, and a resolution of an image source is not reduced. Therefore, a resolution of the 3D image is better than an image resolution of the 3D technology based on 2D binocular parallax.

In a possible implementation, the display system further includes a combiner. The combiner is configured to receive the virtual 3D image sent by the imaging unit; and combine the virtual 3D image with an image of a real object.

In a possible implementation, the display system further includes a reflector. The reflector is configured to receive the virtual 3D image sent by the imaging unit; and reflect the virtual 3D image.

According to a third aspect, an embodiment further provides a display method, and the display method includes: A time sequence control unit generates a plurality of time sequence instructions that belong to a first switching period, and sends the plurality of time sequence instructions that belong to the first switching period to a multi-focus image generation unit. The multi-focus image generation unit receives the plurality of time sequence instructions that belong to the first switching period from the time sequence control unit, and generates a plurality of corresponding 3D image blocks at different distances based on the plurality of time sequence instructions, where the plurality of 3D image blocks respectively have different depth information, and the plurality of 3D image blocks belong to a 3D image for display in the first switching period. The display apparatus provided in this embodiment of this application includes a multi-focus image generation unit, where the multi-focus image generation unit may generate a plurality of 3D image blocks with depth information based on time sequence control. Therefore, a 3D image formed by the apparatus has real depth distribution, and a display effect of the 3D image is better than that of a 3D technology based on 2D binocular parallax. In addition, in this embodiment, the 3D image block is generated by the apparatus only based on time sequence control, and a resolution of an image source is not reduced. Therefore, a resolution of the 3D image is better than an image resolution of the 3D technology based on 2D binocular parallax.

In a possible implementation, the display method further includes: The time sequence control unit generates a plurality of time sequence instructions that belong to a second switching period, and sends the plurality of time sequence instructions that belong to the second switching period to the multi-focus image generation unit. The multi-focus image generation unit receives the plurality of time sequence instructions that belong to the second switching period from the time sequence control unit, and generates a plurality of corresponding 3D image blocks at different distances based on the plurality of time sequence instructions that belong to the second switching period, where the plurality of 3D image blocks that belong to the second switching period respectively have different depth information, and the plurality of 3D image blocks that belong to the second switching period belong to a 3D image for display in the second switching period.

In a possible implementation, the plurality of time sequence instructions that belong to the first switching period include a first time sequence instruction and a second time sequence instruction. That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes: The multi-focus image generation unit receives the first time sequence instruction, and generates a corresponding first 3D image block at a first distance based on the first time sequence instruction; and receives the second time sequence instruction, and generates a corresponding second 3D image block at a second distance based on the second time sequence instruction. The first 3D image block and the second 3D image block respectively have different depth information, and the first 3D image block and the second 3D image block belong to the 3D image for display in the first switching period.

In a possible implementation, the multi-focus image generation unit includes a fixed-focus assembly. That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes: The fixed-focus assembly receives the plurality of time sequence instructions that belong to the first switching period from the time sequence control unit; and changes a distance from an object to the fixed-focus assembly for a plurality of times based on the plurality of time sequence instructions that belong to the first switching period, and generates a plurality of corresponding 3D image blocks when changing the distance from the object to the fixed-focus assembly for a plurality of times.

In a possible implementation, the multi-focus image generation unit includes a zoom assembly. That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes: The zoom assembly receives the plurality of time sequence instructions that belong to the first switching period from the time sequence control unit; and changes a focal length of the zoom assembly for a plurality of times based on the plurality of time sequence instructions that belong to the first switching period, and generates a plurality of corresponding 3D image blocks when changing the focal length of the zoom assembly for a plurality of times.

In a possible implementation, the multi-focus image generation unit includes a spatial light modulator. That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes: The spatial light modulator receives the plurality of time sequence instructions that belong to the first switching period from the time sequence control unit; and loads different spatial phase information for a plurality of times based on the plurality of time sequence instructions that belong to the first switching period, and generates a plurality of corresponding 3D image blocks when loading the different spatial phase information for a plurality of times.

In a possible implementation, the display method further includes: A diffuser screen receives the plurality of time sequence instructions that belong to the first switching period from the time sequence control unit, and receives the plurality of 3D image blocks that belong to the first switching period from the multi-focus image generation unit; and displays the 3D image in the first switching period based on the plurality of time sequence instructions that belong to the first switching period and the depth information respectively corresponding to the plurality of 3D image blocks that belong to the first switching period. The diffuser screen is separately connected to the multi-focus image generation unit and the time sequence control unit.

In a possible implementation, the diffuser screen includes a plurality of layers of diffuser sub-screens. The displaying the 3D image in the first switching period based on the plurality of time sequence instructions that belong to the first switching period and the depth information respectively corresponding to the plurality of 3D image blocks that belong to the first switching period includes: The plurality of layers of diffuser sub-screens determine a diffuser sub-screen currently used for display from the plurality of layers of diffuser sub-screens based on a current time sequence instruction in the plurality of time sequence instructions that belong to the first switching period, and display a 3D image block corresponding to the current time sequence instruction by using the diffuser sub-screen currently used for display.

In a possible implementation, the displaying the 3D image in the first switching period based on the plurality of time sequence instructions that belong to the first switching period and the depth information respectively corresponding to the plurality of 3D image blocks that belong to the first switching period includes: The diffuser screen determines a current position of the diffuser screen based on a current time sequence instruction in the plurality of time sequence instructions that belong to the first switching period, and displays a 3D image block corresponding to the current time sequence instruction at the current position.

In a possible implementation, the display method further includes: An imaging unit receives an optical signal transmitted by the diffuser screen, where the optical signal includes the 3D image for display in the first switching period. The imaging unit generates a virtual 3D image based on the optical signal, and sends the virtual 3D image.

In a possible implementation, the display method further includes: A combiner receives the virtual 3D image sent by the imaging unit; and combines the virtual 3D image with an image of a real object.

In a possible implementation, the display method further includes: A reflector receives the virtual 3D image sent by the imaging unit; and reflects the virtual 3D image.

According to the third aspect of this application, the display method may further perform the steps described in the foregoing first aspect and various possible implementations. For details, refer to the description of the first aspect and the various possible implementations.

DESCRIPTION OF EMBODIMENTS

Embodiments provide a naked-eye 3D display apparatus, system, and method, where a 3D image is displayed based on real depth information, so as to improve a display effect of the 3D image and a resolution of the 3D image.

The following describes embodiments with reference to accompanying drawings.

In the specification, claims, and accompanying drawings of this disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
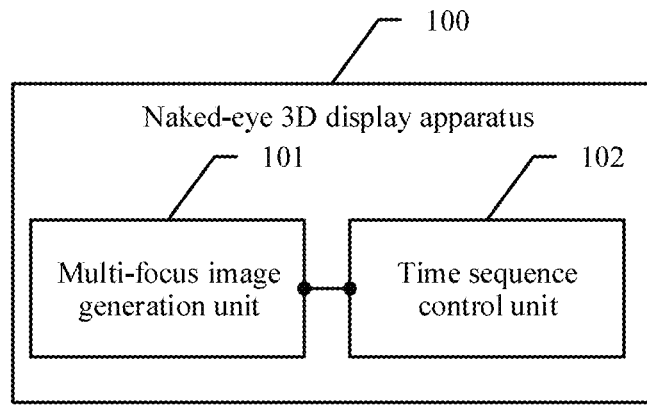
FIG. 1 is a schematic diagram of a composition structure of a naked-eye 3D display apparatus according to an embodiment.

A technical solution in the embodiments may be applied to a display apparatus. For example, the display apparatus includes a naked-eye 3D display apparatus. In a subsequent embodiment, the naked-eye 3D display apparatus is used as an example for description. As shown in FIG. 1, a naked-eye 3D display apparatus 100 includes a multi-focus image generation unit 101 and a time sequence control unit 102, where the multi-focus image generation unit 101 is connected to the time sequence control unit 102.

The time sequence control unit 102 is configured to generate a plurality of time sequence instructions that belong to a first switching period, and send the plurality of time sequence instructions that belong to the first switching period.

The multi-focus image generation unit 101 is configured to receive the plurality of time sequence instructions that belong to the first switching period from the time sequence control unit 102, and generate a plurality of corresponding 3D image blocks at different distances based on the plurality of time sequence instructions, where the plurality of 3D image blocks respectively have different depth information, and the plurality of 3D image blocks belong to a 3D image for display in the first switching period.

The time sequence control unit 102 may sequentially generate a plurality of time sequence instructions based on clock information, and the clock information may include a plurality of clocks, for example, a plurality of moments such as a moment t1, a moment t2, . . . , and a moment tn, where one time sequence instruction may include one piece of timing information. One time sequence instruction is used to trigger the multi-focus image generation unit 101 to generate one 3D image block, and the plurality of time sequence instructions may be used to trigger the multi-focus image generation unit 101 to generate a plurality of 3D image blocks. For example, a quantity of the time sequence instructions may be represented by a letter n, and a value of n is a positive integer. The time sequence control unit 102 may further generate a plurality of time sequence instructions based on a preset switching period, and the plurality of time sequence instructions may belong to one switching period. For example, if a current switching period is the first switching period, a plurality of time sequence instructions that belong to the first switching period may be generated. After execution in the first switching period ends, the time sequence control unit 102 may further generate a plurality of time sequence instructions that belong to a second switching period. A switching period is a time required for displaying all image blocks included in a complete 3D image once. For example, the switching period is far less than a reaction time of a human eye. In some implementations of this application, the time sequence control unit may be implemented by using a single-chip microcomputer or a circuit card. The single-chip microcomputer or the circuit card may periodically generate a voltage trigger signal, and the voltage trigger signal may be used as the foregoing time sequence instruction.

In this embodiment, the time sequence control unit 102 generates the plurality of time sequence instructions that belong to the first switching period, and sends the plurality of time sequence instructions that belong to the first switching period, where duration of the first switching period is less than a time required for refreshing a display once. For example, a refreshing frequency of the display may be 60 Hz, the duration of the first switching period may be less than or equal to $\frac{1}{60}$ seconds, and a specific time length of the first switching period is not limited. The time sequence control unit 102 immediately sends one time sequence instruction once the time sequence instruction is generated, and immediately sends one next time sequence instruction once the next time sequence instruction is generated. For example, the time sequence control unit 102 may further send a plurality of time sequence instructions based on a preset time interval, and the time interval is related to a size of the first switching period and a quantity of image blocks segmented from one complete image. For example, a smaller first switching period indicates a shorter time interval. For another example, a larger quantity of image blocks segmented from one complete image indicates a shorter time interval. For example, the duration of the first switching period is equal to $\frac{1}{60}$ seconds, and if the quantity of image blocks segmented from one complete image is 4, the time interval for sending the time sequence instructions may be $\frac{1}{240}$ seconds. In an actual application scenario, when the human eye observes an image, a time of persistence of vision exists. For example, this time varies with individuals. In this embodiment, the time interval for sending the time sequence instructions is far less than the time of persistence of vision of the human eye. Specifically, the time interval for sending the time sequence instructions may be determined with reference to an application scenario.

In this embodiment, the multi-focus image generation unit 101 receives the plurality of time sequence instructions that belong to the first switching period from the time sequence control unit 102, and generates the plurality of corresponding 3D image blocks at different distances based on the plurality of time sequence instructions, where the 3D image block may alternatively be referred to as slices of a naked-eye 3D image. The distance refers to a distance from a position of the multi-focus image generation unit to a position of the 3D image block, and a distance from a current position of the multi-focus image generation unit to a position of each 3D image block is different when the multi-focus image generation unit generates the 3D image block. For example, for each time sequence instruction, the multi-focus image generation unit 101 may generate one 3D image block at one distance. Therefore, when the multi-focus image generation unit 101 generates each 3D image block, the 3D image block naturally has one piece of depth information, so that the plurality of 3D image blocks respectively have different depth information, and the plurality of 3D image blocks belong to the 3D image for display in the first switching period.

In some embodiments, the time sequence control unit 102 is further configured to generate the plurality of time sequence instructions that belong to the second switching period and send the plurality of time sequence instructions that belong to the second switching period.

The multi-focus image generation unit 101 is configured to receive the plurality of time sequence instructions that belong to the second switching period from the time sequence control unit 102, and generate a plurality of corresponding 3D image blocks at different distances based on the plurality of time sequence instructions that belong to the second switching period, where the plurality of 3D image blocks that belong to the second switching period respectively have different depth information, and the plurality of 3D image blocks that belong to the second switching period belong to a 3D image for display in the second switching period.

The second switching period and the first switching period are different switching periods, and in this embodiment, the time sequence control unit 102 may further generate time sequence instructions of more switching periods, which is not limited. Therefore, in each switching period, the multi-focus image generation unit 101 may generate a plurality of 3D image blocks, and the plurality of 3D image blocks respectively have different depth information, so that the plurality of 3D image blocks can constitute a 3D image for display in one switching period. After one 3D image is displayed in one switching period, one next generated 3D image may be further displayed in one next switching period, so that a plurality of 3D images can be cyclically displayed, thereby implementing a naked-eye 3D display effect.

This embodiment provides a naked-eye 3D display apparatus. Once one 3D image block is generated, the multi-focus image generation unit may perform phase modulation based on the time sequence instruction of the time sequence control unit, so as to control generation of 3D image blocks at different positions in space, thereby implementing 3D stereoscopic vision with depth information. A naked-eye 3D based on this apparatus can support a real 3D complete image with a high resolution. Compared with a current naked-eye 3D technology based on binocular parallax, the naked-eye 3D image generated in this embodiment s a real spatial 3D image block, and the 3D image block has depth information. While an image in the naked-eye 3D technology based on the binocular parallax is a 2D image, depth information is obtained by analyzing a vision difference between two eyes by using a human brain. In addition, in this embodiment of this application, the multi-focus image generation unit generates the 3D image block based on the time sequence instruction, and a resolution of the image is not reduced because of introduction of the depth information, thereby improving an imaging effect of the 3D image.

In some embodiments of this application, the plurality of time sequence instructions that belong to the first switching period include a first time sequence instruction and a second time sequence instruction.

The multi-focus image generation unit 101 is configured to receive the first time sequence instruction and generate a corresponding first 3D image block at a first distance based on the first time sequence instruction; and receive the second time sequence instruction and generate a corresponding second 3D image block at a second distance based on the second time sequence instruction.

The first 3D image block and the second 3D image block respectively have different depth information, and the first 3D image block and the second 3D image block belong to the 3D image for display in the first switching period.

Specifically, that the plurality of time sequence instructions that belong to the first switching period are the first time sequence instruction and the second time sequence instruction is used as an example for description. Then, the multi-focus image generation unit 101 needs to generate one 3D image block at one distance based on each time sequence instruction. For example, the corresponding first 3D image block is generated at the first distance based on the first time sequence instruction, and the corresponding second 3D image block is generated at the second distance based on the second time sequence instruction. For another example, if the first switching period further includes a third time sequence instruction and a fourth time sequence instruction, the multi-focus image generation unit 101 may respectively generate the first 3D image block, the second 3D image block, a third 3D image block, and a fourth 3D image block at four different distances. In this embodiment of this application, the multi-focus image generation unit 101 generates the plurality of 3D image blocks, where the plurality of 3D image blocks respectively have different depth information, so that the plurality of 3D image blocks can constitute the 3D image for display in the first switching period. Therefore, the 3D image generated in this embodiment of this application has real depth information, thereby improving the naked-eye 3D display effect.

Figure 2:
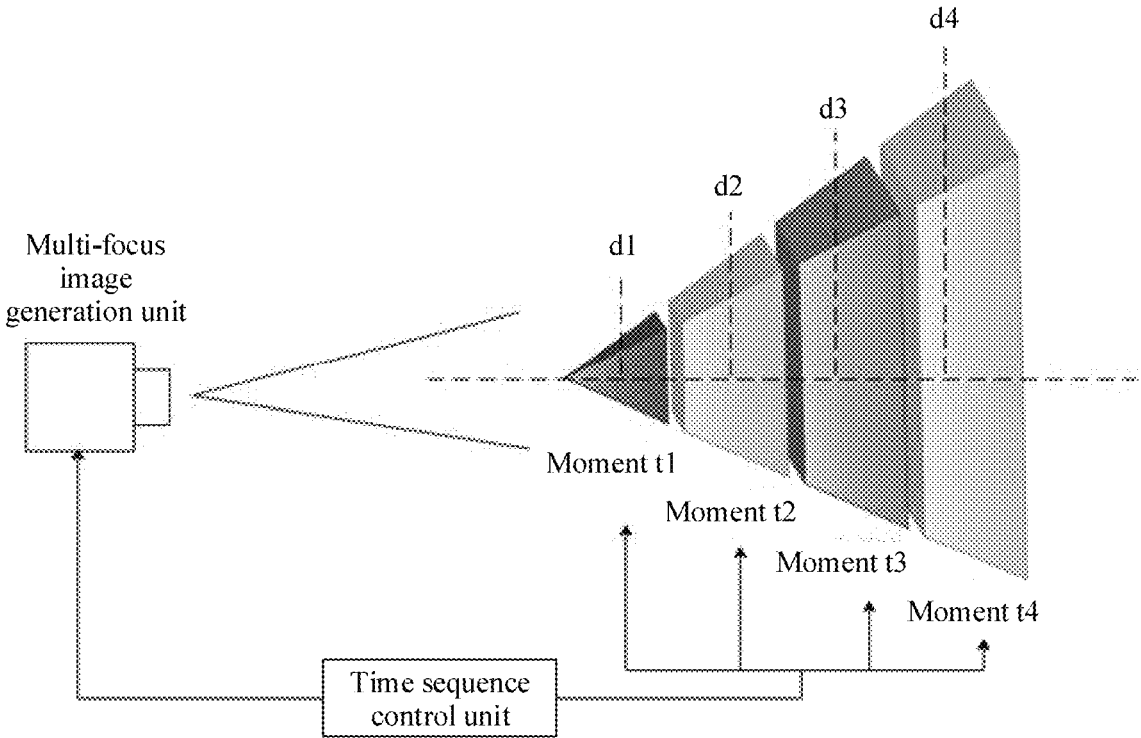
FIG. 2 is a schematic diagram of an application scenario of generating a multi-focus image based on time sequence control according to an embodiment.

The following uses an example to describe a working principle of the multi-focus image generation unit 101 in this embodiment of this application. As shown in FIG. 2, a naked-eye 3D display apparatus provided in this embodiment of this application includes a multi-focus image generation unit and a time sequence control unit. The multi-focus image generation unit may generate images at different distances, for example, the multi-focus image generation unit may be implemented by using a zoom element. In a subsequent embodiment, some implementations of the multi-focus image generation unit are described in detail. As shown in FIG. 2, the time sequence control unit controls the multi-focus image generation unit to generate different images at different distances at different moments. As shown in FIG. 2, if an image of a 3D pyramid is segmented into four parts, original image information may include three-dimensional information, so that a distance of each part of the segmented images can be determined. If an original image is a 2D image, the 2D image may also be processed into an image source with depth information. During time sequence control, the multi-focus image generation unit generates an image of a pyramid tip part at a distance d1 at a moment t1, generates an image of an upper part of a pyramid body at a distance d2 at a moment t2, generates an image of a lower part of the pyramid body at a distance d3 at a moment t3, and generates an image of a pyramid bottom part at d4 at a moment t4. The images are continuously cyclically switched with a time sequence. For example, there are n time sequence slices from front to back, and one switching period may be completed after a slice 1 to a slice n are sequentially displayed. The images can be continuously refreshed from the slice 1 to the slice n in another switching period. A time of the switching period is far less than a reaction time of a human eye, and the time of the switching period may be a time for displaying all slices once. For an observer, it is like that four image blocks exist in space at the same time, and a depth of each part of the pyramid is different. Depth information of the four image blocks is implemented by using the multi-focus image generation unit, and each part of the image blocks is imaged based on corresponding depth information and has real depth information, so that a real 3D imaging effect is generated for the observer.

Figure 3A:
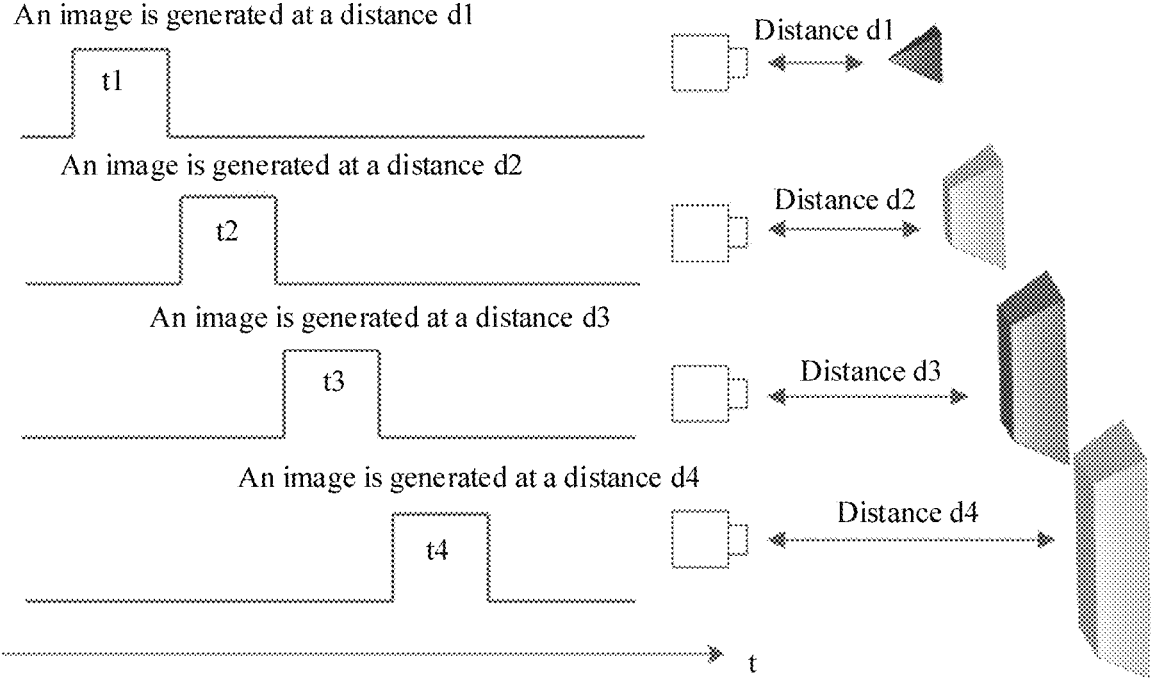
FIG. 3a is a schematic diagram of an application scenario of a multi-focus image generation unit according to an embodiment.

As shown in FIG. 3a, the following describes a process in which the time sequence control unit drives the multi-focus image generation unit, and the time sequence control unit drives the multi-focus image generation unit to generate a required image at a corresponding distance based on a time sequence instruction. As shown in FIG. 3a, for example, the multi-focus image generation unit is driven to generate a pyramid tip at a distance d1 at a moment t1, the multi-focus image generation unit is driven to generate a second part of an image block of the pyramid at a distance d2 at a moment t2; the multi-focus image generation unit is driven to generate a third part of the image block at a distance d3 at a moment t3, and the multi-focus image generation unit is driven to generate a pyramid bottom at a distance d4 at a moment t4. In this way, one time of complete display of the pyramid is completed.

Figure 3B:
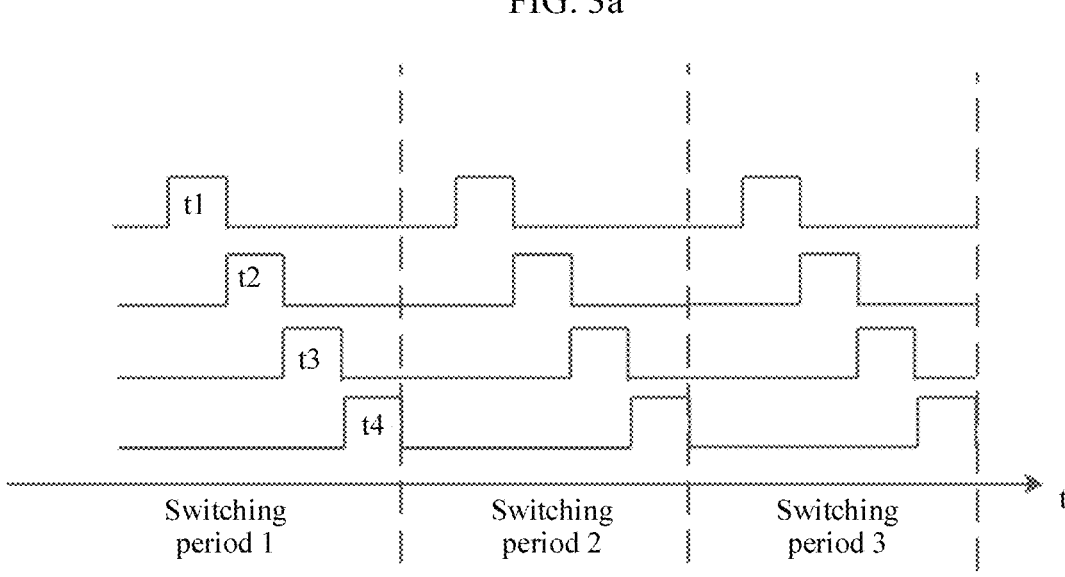
FIG. 3b is a schematic diagram of an application scenario of a plurality of switching periods according to an embodiment.

As shown in FIG. 3b, the time sequence control unit may sequentially cyclically execute a 3D image generating process shown in FIG. 3a in three switching periods. The time sequence cycles a sequence from t1 to t4 to drive the multi-focus image generation unit. Corresponding image blocks generated at positions from d1 to d4 are also cyclically generated. Times from t1 to t4 are four moments included in a switching period 1. Likewise, a switching period 2 and a switching period 3 may each include four moments. Areal 3D image of the pyramid can be always displayed by cyclical execution in the three switching periods. 3D images that need to be generated in different switching periods may alternatively be different, which is not limited and is determined with reference to an application scenario.

In some embodiments, the multi-focus image generation unit 101 has a plurality of implementations, and the following describes detailed examples. The multi-focus image generation unit 101 includes a fixed-focus assembly.

The fixed-focus assembly is configured to receive the plurality of time sequence instructions that belong to the first switching period from the time sequence control unit 102; and change a distance from an object to the fixed-focus assembly for a plurality of times based on the plurality of time sequence instructions that belong to the first switching period, and generate a plurality of corresponding 3D image blocks when changing the distance from the object to the fixed-focus assembly for a plurality of times.

Figure 4A:
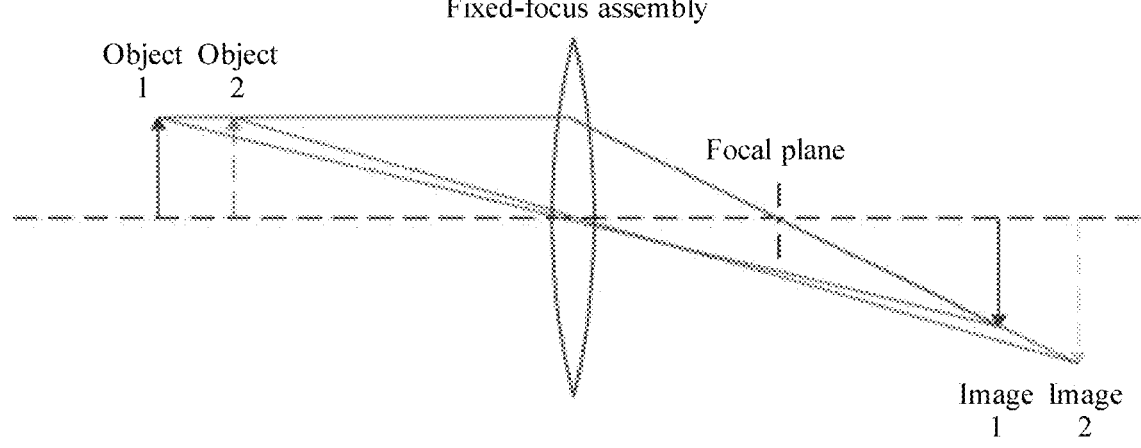
FIG. 4a is a schematic diagram of an application scenario of a fixed-focus assembly according to an embodiment.

As shown in FIG. 4a, the multi-focus image generation unit is implemented based on the fixed-focus assembly. Images at different distances are generated by changing the distance from the object to the fixed-focus assembly, and the object is a target that needs to be imaged. The fixed-focus assembly may be a convergence lens, and a focal length of the lens is f According to an imaging formula of a single lens, $1/f=1/u+1/v$, where f is the focal length, u is an object distance, and v is an image distance. It can be learned that different image distances v can be implemented by changing the object distance u. Therefore, multi-focus imaging can be implemented by moving a position of the object relative to the fixed-focus assembly. For example, the object may be moved in a mechanically controlled manner, to change the distance from the object to the fixed-focus assembly for a plurality of times. In this embodiment of this application, the multi-focus image generation unit 101 may be implemented by using the fixed-focus assembly, and the fixed-focus assembly may generate a plurality of 3D image blocks, where the plurality of 3D image blocks respectively have different depth information, so that the plurality of 3D image blocks can constitute the 3D image for display in the first switching period. Therefore, the 3D image generated in this embodiment of this application has real depth information, thereby improving the naked-eye 3D display effect.

In some embodiments, the multi-focus image generation unit 101 includes a zoom assembly.

The zoom assembly is configured to receive the plurality of time sequence instructions that belong to the first switching period from the time sequence control unit 102; and change a focal length of the zoom assembly for a plurality of times based on the plurality of time sequence instructions that belong to the first switching period, and generate a plurality of corresponding 3D image blocks when changing the focal length of the zoom assembly for a plurality of times.

Figure 4B:
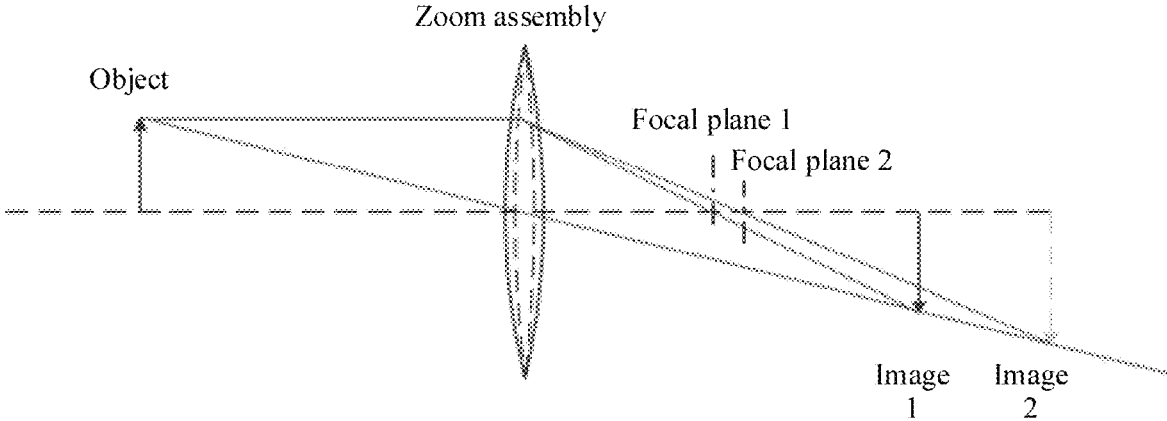
FIG. 4b is a schematic diagram of an application scenario of a zoom assembly according to an embodiment.

As shown in FIG. 4b, it is described in the following that the multi-focus image generation unit is implemented based on the zoom assembly. Likewise, different image distances can be obtained by changing the focal length of the lens. For example, as shown in FIG. 4b, one zoom assembly is used, and the zoom assembly can change the focal length of the zoom assembly, such as a zoom liquid lens. The zoom liquid lens can change surface tension of liquid by changing an applied voltage to achieve different curvature, the zoom liquid lens is a zoom assembly that is adjusted based on a voltage, and an adjustment speed may be very fast. In this embodiment of this application, the multi-focus image generation unit 101 may be implemented by using the zoom assembly, and the zoom assembly may generate a plurality of 3D image blocks, where the plurality of 3D image blocks respectively have different depth information, so that the plurality of 3D image blocks can constitute the 3D image for display in the first switching period. Therefore, the 3D image generated in this embodiment of this application has real depth information, thereby improving the naked-eye 3D display effect.

In some embodiments of this application, the multi-focus image generation unit 101 includes a spatial light modulator (SLM).

The spatial light modulator is configured to receive the plurality of time sequence instructions that belong to the first switching period from the time sequence control unit 102; and load different spatial phase information for a plurality of times based on the plurality of time sequence instructions that belong to the first switching period, and generate a plurality of corresponding 3D image blocks when loading the different spatial phase information for a plurality of times.

Figure 4C:
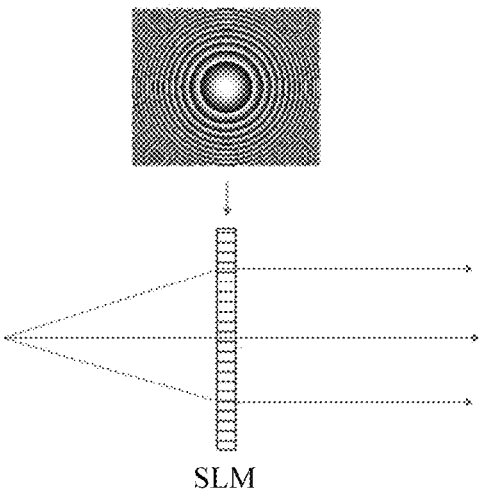
FIG. 4c is a schematic diagram of an application scenario of a spatial light modulator according to an embodiment.

As shown in FIG. 4c, it is described in the following that the multi-focus image generation unit is implemented based on the spatial light modulator. The spatial light modulator is configured to control a spatial light field by loading different spatial phase information, so as to implement imaging at different distances. The spatial light modulator may be a light modulator based on a micro mirror array of a micro-electro-mechanical system (MEMS), or may be a light modulator based on liquid crystal. Liquid crystal on silicon (LCoS) is a spatial light modulator based on liquid crystal, and can implement phase modulation of each pixel by changing a voltage of the pixel, so that high-resolution and high-speed modulation can be implemented. As shown in FIG. 4c, different functions may be implemented by loading different phase information to the SLM. For example, a Fresnel pattern may be loaded on the SLM to control a light field, so as to implement a function of a lens. An mth ring radius rm of the Fresnel pattern is rm=(2mfλ)½, λ is a wavelength of incident light, and f is a lens focal length equivalent to this phase. Therefore, lenses of different focal lengths can be implemented by loading different phase information, and a multi-focus imaging unit can be implemented if the lenses of different focal lengths are used in an imaging unit, so as to implement imaging at different distances by using the loaded phase information.

In this embodiment, the multi-focus image generation unit 101 may be implemented by using the spatial light modulator, and the spatial light modulator may generate a plurality of 3D image blocks, where the plurality of 3D image blocks respectively have different depth information, so that the plurality of 3D image blocks can constitute the 3D image for display in the first switching period. Therefore, the 3D image generated in this embodiment has real depth information, thereby improving the naked-eye 3D display effect.

Figure 5:
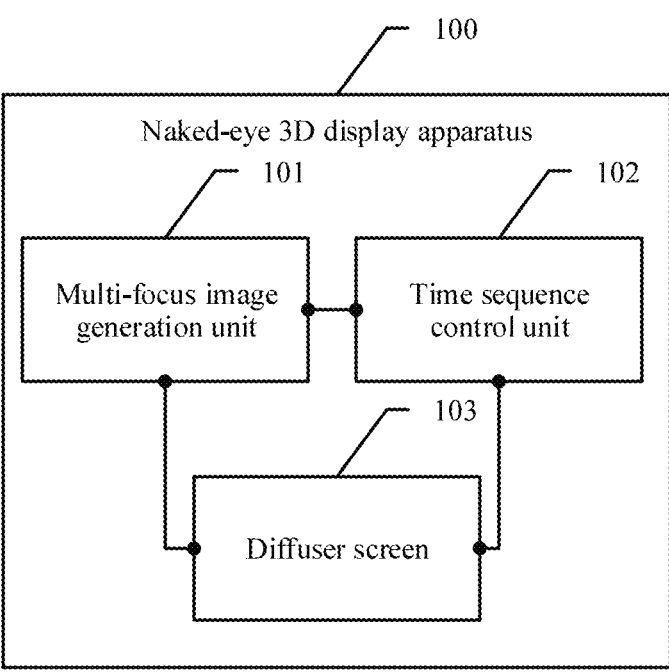
FIG. 5 is a schematic diagram of a composition structure of another naked-eye 3D display apparatus according to an embodiment.

In some embodiments, as shown in FIG. 5, the naked-eye 3D display apparatus 100 further includes a diffuser screen 103.

The diffuser screen 103 is separately connected to the multi-focus image generation unit 101 and the time sequence control unit 102.

The diffuser screen 103 is configured to receive the plurality of time sequence instructions that belong to the first switching period from the time sequence control unit 102, and receive the plurality of 3D image blocks that belong to the first switching period from the multi-focus image generation unit 101; and display the 3D image in the first switching period based on the plurality of time sequence instructions that belong to the first switching period and the depth information respectively corresponding to the plurality of 3D image blocks that belong to the first switching period.

In this embodiment, the human eye can directly view an obtained 3D image, and a viewing angle and distance are not limited. For example, the image can be viewed only directly in a direction of a light beam and within a range in which the human eye can receive the light beam. The naked-eye 3D display apparatus 100 further includes the diffuser screen 103, where the diffuser screen is a diffuser screen based on time sequence control, and the diffuser screen 103 may also be referred to as a body diffuser screen. The diffuser screen can receive an image generated by the multi-focus image generation unit, so that imaging is implemented on the diffuser screen, and a light beam is diverged, so that an image can be viewed by the human eye at a wider angle and position. In addition, a distance of the image received by the diffuser screen needs to change with a time sequence to match a distance of the image generated by the multi-focus image generation unit, so as to ensure that all images generated by the multi-focus image generation unit are at corresponding imaging distances, thereby ensuring imaging quality.

Figure 6A:
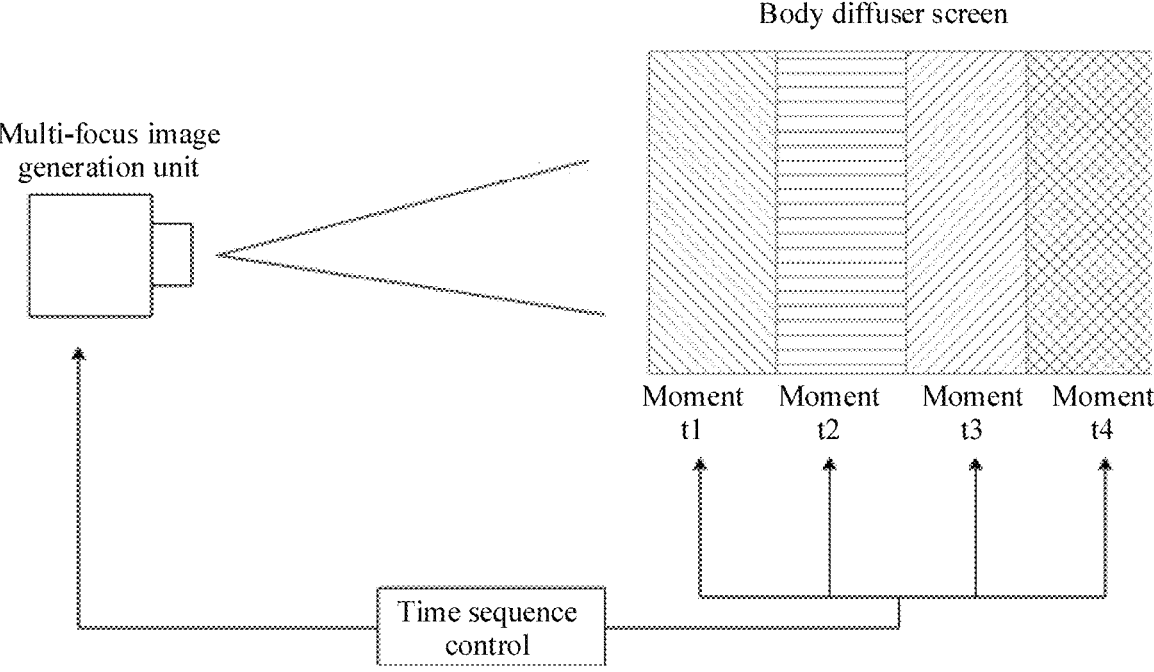
FIG. 6a is a schematic diagram of an application scenario of a diffuser screen according to an embodiment.

In some embodiments, as shown in FIG. 6a, the diffuser screen 103 includes a plurality of layers of diffuser sub-screens.

The plurality of layers of diffuser sub-screens are configured to determine a diffuser sub-screen currently used for display from the plurality of layers of diffuser sub-screens based on a current time sequence instruction in the plurality of time sequence instructions that belong to the first switching period, and display a 3D image block corresponding to the current time sequence instruction by using the diffuser sub-screen currently used for display.

The diffuser screen 103 may also be referred to as a body diffuser screen, and the body diffuser screen is different from a current 2D diffuser screen. The body diffuser screen has a capability of imaging at different depths. The diffuser screen 103 includes the plurality of layers of diffuser sub-screens, where the plurality of layers of diffuser sub-screens are implemented by the diffuser screen based on time sequence control. The plurality of layers of diffuser sub-screens may include a plurality of layers of diffuser screen materials, and each layer of diffuser sub-screen may be controlled, by using power-on, to be transparent or function as a diffuser screen, and power-on information of each layer of diffuser sub-screen is controlled by using the time sequence instruction, so that the diffuser screen based on time sequence control can be implemented. In this embodiment of this application, imaging of the 3D image with depth information can be implemented by using the plurality of layers of diffuser sub-screens, and has an imaging effect of a real 3D image.

Figure 6B:
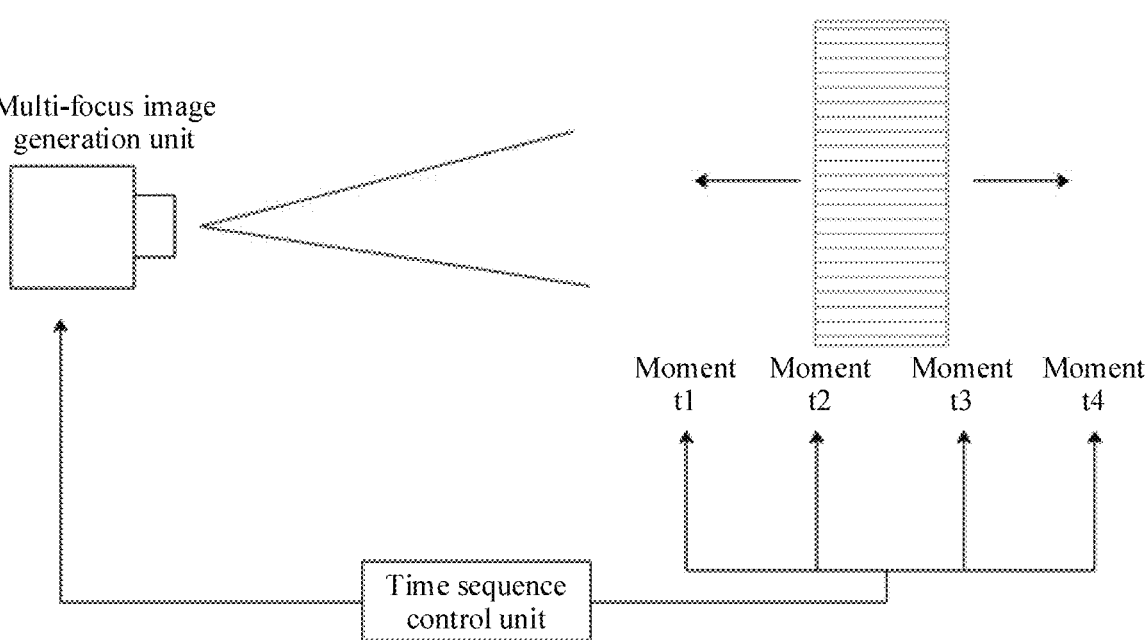
FIG. 6b is a schematic diagram of an application scenario of another diffuser screen according to an embodiment.

In some embodiments, as shown in FIG. 6b, the diffuser screen 103 is configured to determine a current position of the diffuser screen 103 based on a current time sequence instruction in the plurality of time sequence instructions that belong to the first switching period, and display a 3D image block corresponding to the current time sequence instruction at the current position.

The diffuser screen 103 may alternatively be implemented in a mechanical manner. As shown in FIG. 6b, front and back movement of a single diffuser screen is mechanically controlled to match different distance requirements of a multi-focus image. A moving speed in a mechanical manner may be determined based on a specific application scenario. When a distance needs to be changed quickly in a large range, a moving speed of the diffuser screen may be accelerated. In this embodiment of this application, imaging of the 3D image with depth information can be implemented by using the diffuser screen, and has an imaging effect of a real 3D image.

This embodiment provides a naked-eye 3D display apparatus, where the apparatus includes one multi-focus image generation unit and one time sequence control unit. Based on time sequence control of the time sequence control unit, the multi-focus image generation unit may generate corresponding images at different distances to implement 3D image display. A time sequence-controlled diffuser screen may be added based on the naked-eye 3D display apparatus to receive corresponding image information, so that the naked-eye 3D display apparatus can be used as a naked-eye 3D projector, which can expand a viewing angle and range.

Figure 7:
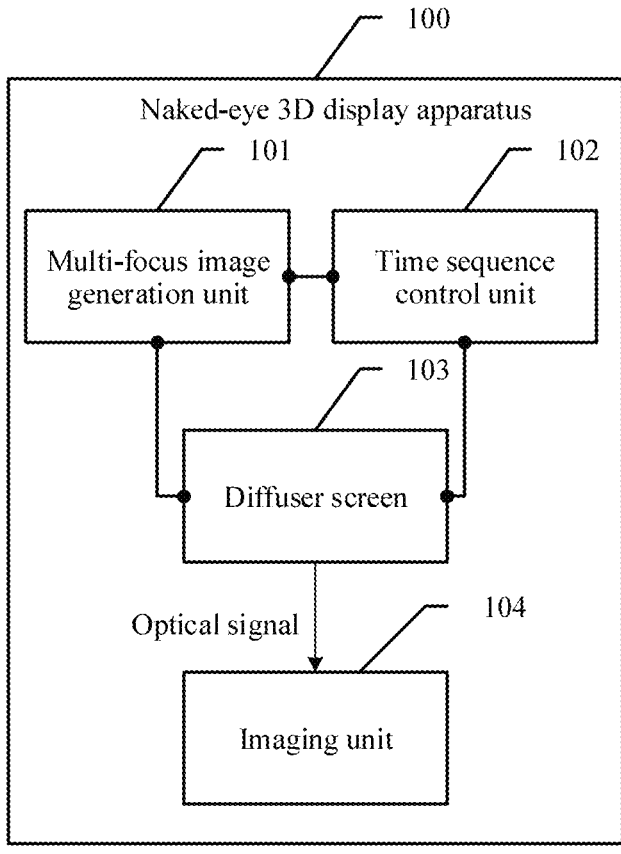
FIG. 7 is a schematic diagram of a composition structure of another naked-eye 3D display apparatus according to an embodiment.

In some embodiments, as shown in FIG. 7, the naked-eye 3D display apparatus 100 further includes an imaging unit 104.

The imaging unit 104 is configured to receive an optical signal transmitted by the diffuser screen 103, where the optical signal includes the 3D image for display in the first switching period; and generate a virtual 3D image based on the optical signal, and send the virtual 3D image.

The 3D image formed by the diffuser screen 103 is a real image, and the naked-eye 3D display apparatus 100 further includes the imaging unit 104, where the imaging unit generates a virtual image corresponding to the formed real image and projects the virtual image to the human eye, so that the corresponding virtual 3D image can be observed by the human eye, thereby implementing the naked-eye 3D display effect.

Figure 8:
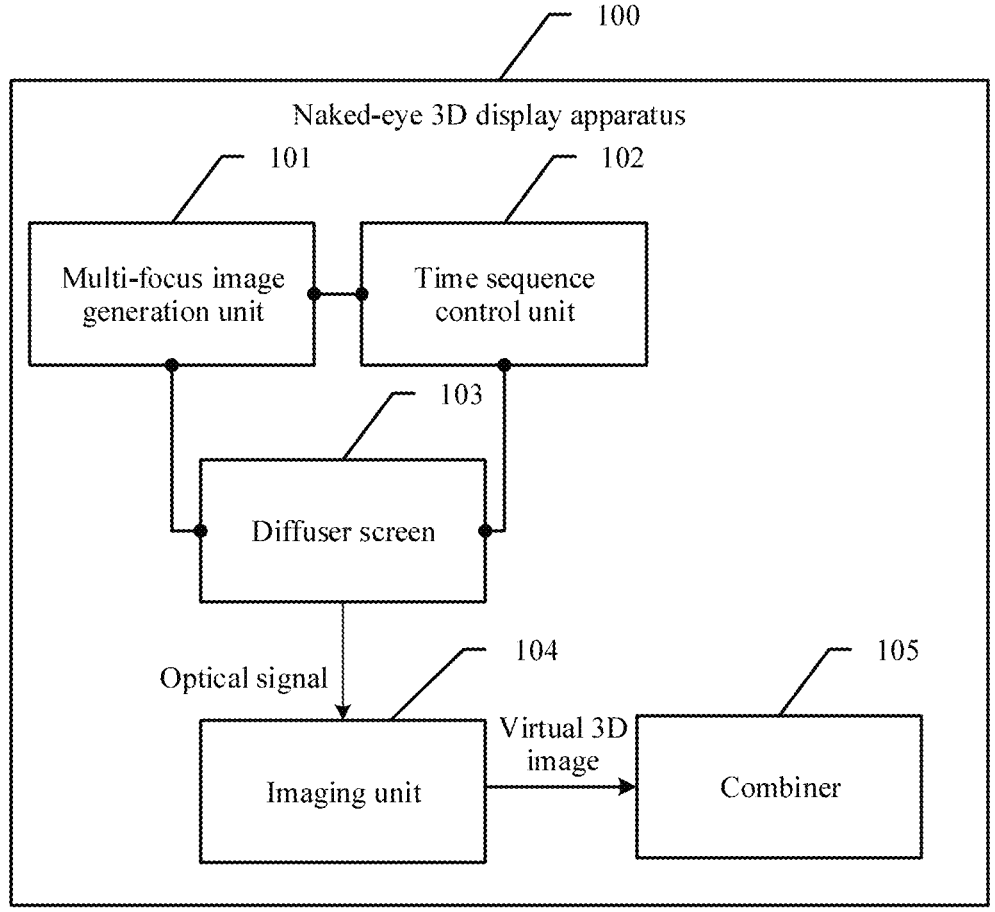
FIG. 8 is a schematic diagram of a composition structure of another naked-eye 3D display apparatus according to an embodiment.

In some embodiments, as shown in FIG. 8, the naked-eye 3D display apparatus 100 further includes a combiner 105.

The combiner 105 is configured to receive the virtual 3D image sent by the imaging unit 104; and generate a virtual display 3D image based on the virtual 3D image.

The combiner 105 may receive the virtual 3D image sent by the imaging unit 104, and with reference to a real scenario, may generate the virtual display 3D image based on the real scenario, thereby implementing a comprehensive display effect of the virtual display 3D image.

Figure 9:
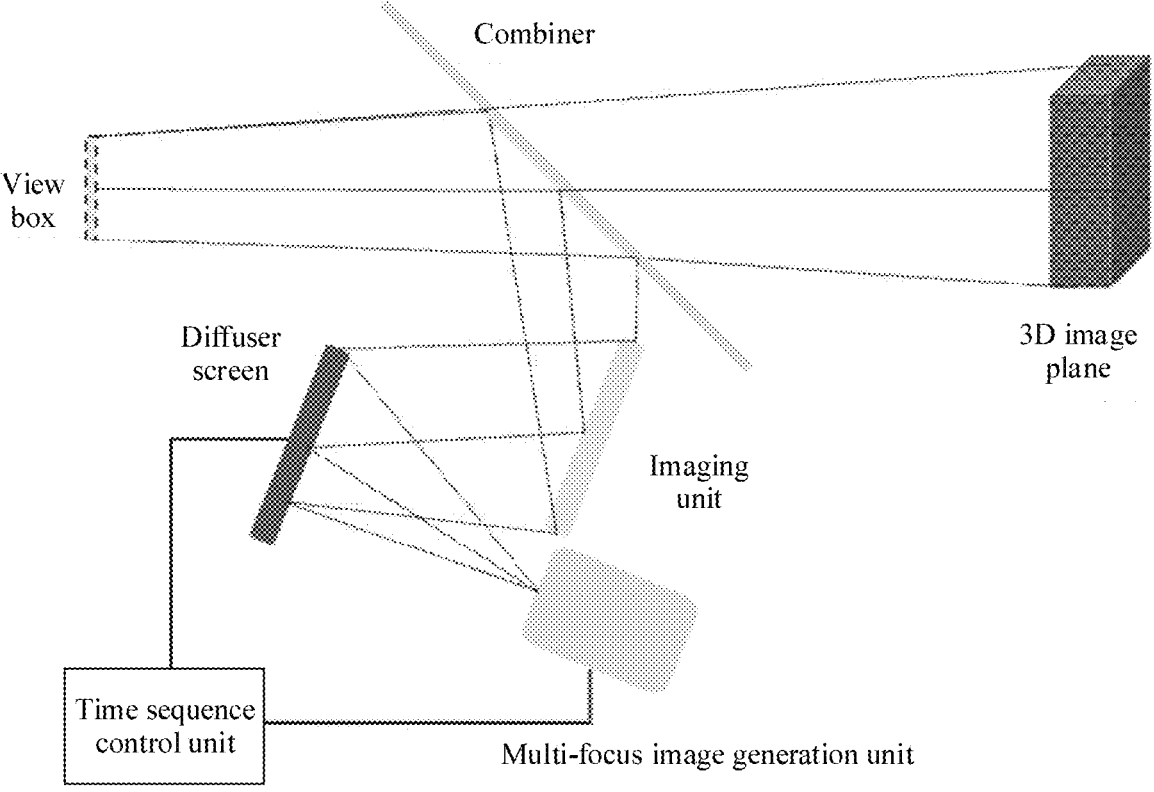
FIG. 9 is a schematic diagram of an application scenario of an imaging unit and a combiner according to an embodiment.

For example, the image formed by the diffuser screen 103 is a real image. If the imaging unit is used for generating the virtual image corresponding to the formed real image and projects the virtual image to the human eye, the corresponding virtual image can be observed by the human eye. This may be applied to augmented reality (AR) display and virtual reality (VR) display. The naked-eye 3D display apparatus is combined with an augmented reality (AR) apparatus and a virtual reality (VR) apparatus. Only one additional imaging unit is required, so that the generated naked-eye 3D image can generate the virtual image that can enter the human eye, and the 3D image can be observed at a corresponding distance. For example, the naked-eye 3D display apparatus may be applied to a 3D head-up display (HUD) system. As shown in FIG. 9, an entity image is generated on the diffuser screen. The entity image generates a virtual image by using the imaging unit, and the virtual image fuses the virtual 3D image with a real scene on the right side of the combiner by using the combiner so as to generate 3D virtual reality imaging. In this embodiment, by using the additional imaging unit, the time sequence control unit, and the multi-focus image generation unit, the 3D image generated on the diffuser screen becomes the virtual image, as if the human eye sees the 3D image in space after receiving the virtual image, and the virtual image may be combined with an external real-time scene by using the combiner to implement an AR head-up display effect of the naked-eye 3D. For example, the combiner may be a wind-shield.

Figure 10:
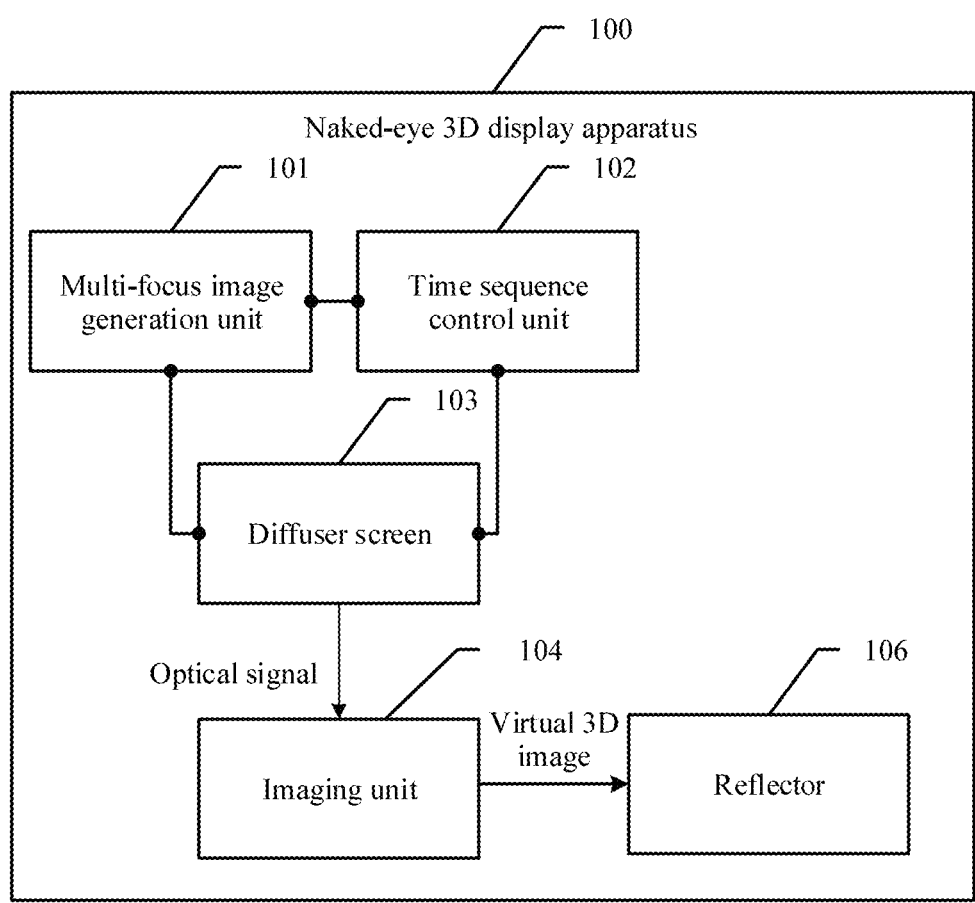
FIG. 10 is a schematic diagram of a composition structure of another naked-eye 3D display apparatus according to an embodiment.

In some embodiments, as shown in FIG. 10, the naked-eye 3D display apparatus 100 further includes a reflector 106.

The reflector is configured to receive the virtual 3D image sent by the imaging unit 104; and reflect the virtual 3D image.

Figure 11:
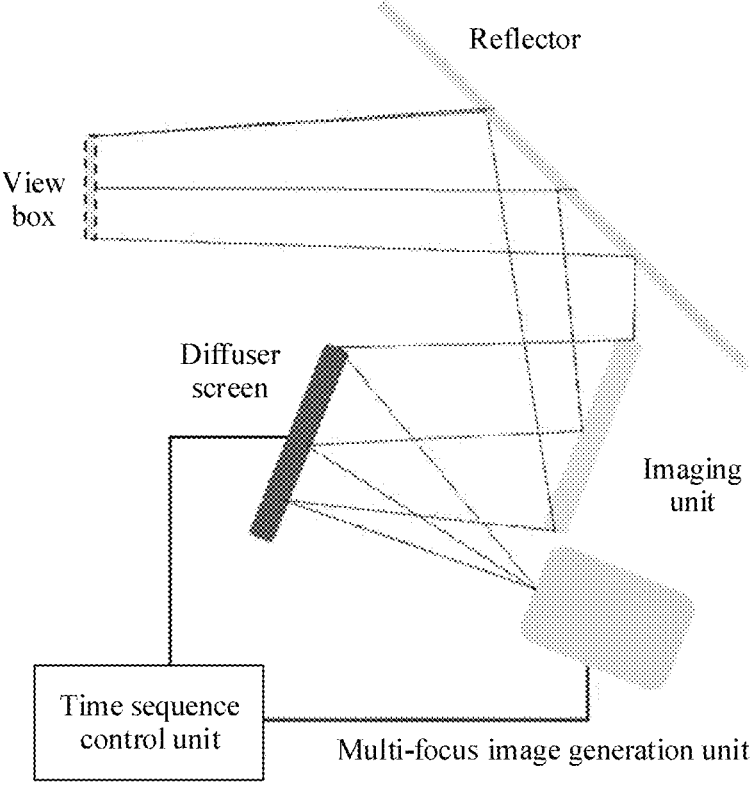
FIG. 11 is a schematic diagram of an application scenario of an imaging unit and a reflector according to an embodiment.

The naked-eye 3D display apparatus 100 provided in this embodiment may be further used for AR glasses and a naked-eye 3D display. The naked-eye 3D display apparatus 100 further includes the reflector 106. As shown in FIG. 11, the observer sees only the 3D virtual image, just like a 3D display. Because the imaging unit generally has an enlarging function, a 3D image that is actually viewed is much larger than an area of the reflector, and therefore, an imaging area is larger, and the imaging unit may be used in usual working and entertainment scenarios.

This embodiment provides a naked-eye 3D display apparatus, and the 3D image formed by the apparatus has real depth distribution. A 3D sense of the 3D image is better than that of a 3D technology based on 2D binocular parallax, because the 2D binocular parallax separates images of the left eye and the right eye by using a grating and a lens technology, and a resolution is reduced by half. The image in this embodiment of this application is not segmented for the left eye and the right eye, and processing in the time sequence does not reduce a resolution of an image source. One additional imaging unit may be added to the naked-eye 3D display apparatus, so that the 3D image formed by naked-eye 3D generates a corresponding enlarged virtual image, a naked-eye 3D display is implemented by receiving the virtual image by the human eye, and the imaging area is larger. One combiner may be added based on the naked-eye 3D display to combine the formed virtual image with the external real scene, so as to implement a naked-eye 3D AR apparatus, for example, used in a car, to implement the AR head-up display effect of the naked-eye 3D.

To better implement the foregoing solutions in this embodiment, the following further provides a related apparatus for implementing the foregoing solution.

Figure 12:
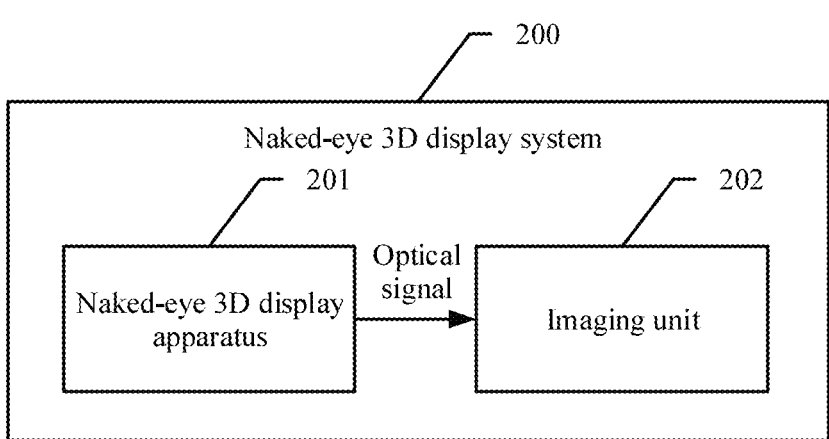
FIG. 12 is a schematic diagram of a composition structure of a naked-eye 3D display system according to an embodiment.

As shown in FIG. 12, an embodiment provides a naked-eye 3D display system, where the naked-eye 3D display system 200 includes a naked-eye 3D display apparatus 201 and an imaging unit 202 that are described in the foregoing FIG. 1 to FIG. 6.

For a function of the naked-eye 3D display apparatus 201, refer to the description of the foregoing embodiments, and details are not described herein again.

The imaging unit 202 is configured to receive an optical signal transmitted by the naked-eye 3D display apparatus, where the optical signal includes a 3D image displayed in a first switching period; and generate a virtual 3D image based on the optical signal, and send the virtual 3D image.

Figure 13:
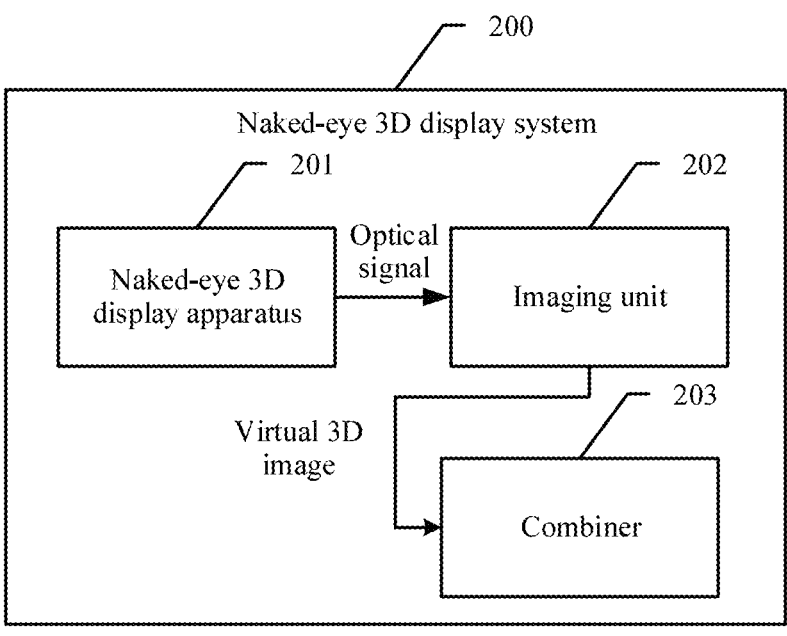
FIG. 13 is a schematic diagram of a composition structure of another naked-eye 3D display system according to an embodiment.

In some embodiments, as shown in FIG. 13, the naked-eye 3D display apparatus 200 further includes a combiner 203.

The combiner is configured to receive the virtual 3D image sent by the imaging unit; and combine the virtual 3D image with an image of a real object.

Figure 14:
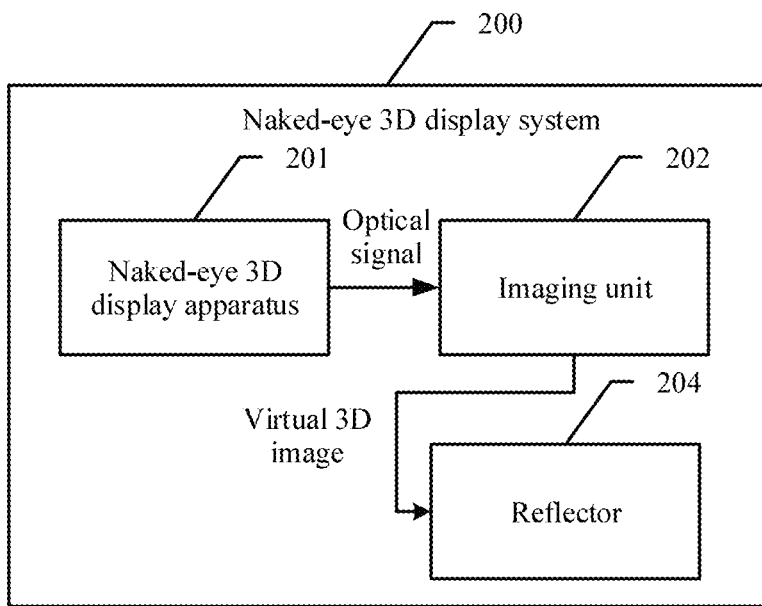
FIG. 14 is a schematic diagram of a composition structure of another naked-eye 3D display system according to an embodiment.

In some embodiments, as shown in FIG. 14, the naked-eye 3D display apparatus 200 further includes a reflector 204.

The reflector is configured to receive the virtual 3D image sent by the imaging unit; and reflect the virtual 3D image.

It can be learned from the description of the foregoing examples that the naked-eye 3D display apparatus includes a multi-focus image generation unit and a time sequence control unit, where the multi-focus image generation unit may be connected to the time sequence control unit. The time sequence control unit generates a plurality of time sequence instructions that belong to the first switching period, and sends the plurality of time sequence instructions that belong to the first switching period. The multi-focus image generation unit receives the plurality of time sequence instructions that belong to the first switching period from the time sequence control unit, and generates a plurality of corresponding 3D image blocks at different distances based on the plurality of time sequence instructions, where the plurality of 3D image blocks respectively have different depth information, and the plurality of 3D image blocks belong to the 3D image for display in the first switching period. The naked-eye 3D display apparatus provided in this embodiment includes the multi-focus image generation unit, where the multi-focus image generation unit may generate a plurality of 3D image blocks with depth information based on time sequence control. Therefore, a 3D image formed by the apparatus has real depth distribution, and a display effect of the 3D image is better than that of a 3D technology based on 2D binocular parallax. In addition, in this embodiment, the 3D image block is generated by the apparatus only based on time sequence control, and a resolution of an image source is not reduced. Therefore, a resolution of the 3D image is better than an image resolution of the 3D technology based on 2D binocular parallax.

It should be noted that content such as information exchange between the modules/units of the apparatus and the execution processes thereof is based on the same idea as the method embodiments, and produces the same technical effects as the method embodiments. For the specific content, refer to the foregoing descriptions in the method embodiments of this disclosure. Details are not described herein again.

Figure 15:
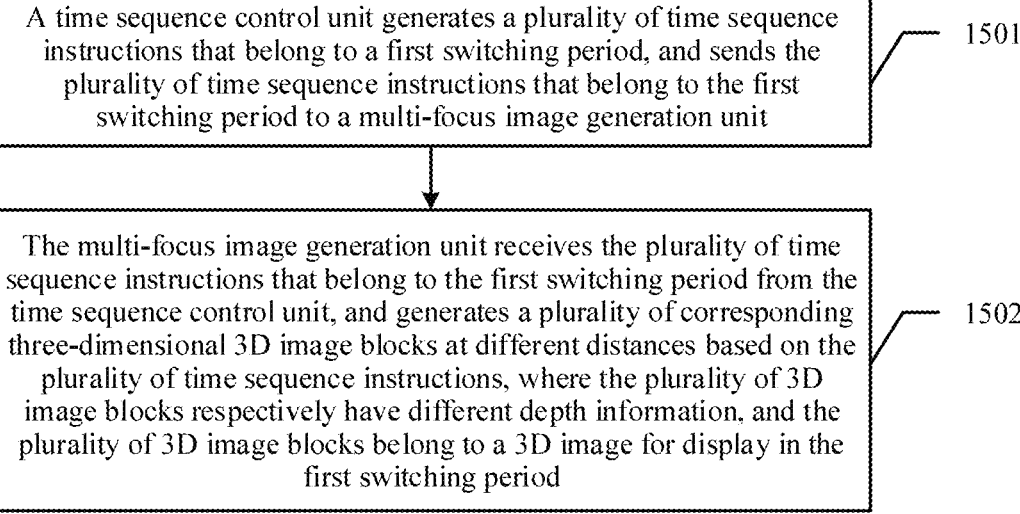
FIG. 15 is a schematic diagram of a flow block of a naked-eye 3D display method according to an embodiment.

As shown in FIG. 15, an embodiment provides a naked-eye 3D display method, where the naked-eye 3D display method includes:

1501: A time sequence control unit generates a plurality of time sequence instructions that belong to a first switching period, and sends the plurality of time sequence instructions that belong to the first switching period to a multi-focus image generation unit.

1502: The multi-focus image generation unit receives the plurality of time sequence instructions that belong to the first switching period from the time sequence control unit, and generates a plurality of corresponding 3D image blocks at different distances based on the plurality of time sequence instructions, where the plurality of 3D image blocks respectively have different depth information, and the plurality of 3D image blocks belong to a 3D image for display in the first switching period.

For functions of the time sequence control unit and the multi-focus image generation unit, refer to the description of the foregoing embodiments, and details are not described herein again.

In some embodiments, the naked-eye 3D display method further includes:

The time sequence control unit generates a plurality of time sequence instructions that belong to a second switching period, and sends the plurality of time sequence instructions that belong to the second switching period to the multi-focus image generation unit.

The multi-focus image generation unit receives the plurality of time sequence instructions that belong to the second switching period from the time sequence control unit, and generates a plurality of corresponding 3D image blocks at different distances based on the plurality of time sequence instructions that belong to the second switching period, where the plurality of 3D image blocks that belong to the second switching period respectively have different depth information, and the plurality of 3D image blocks that belong to the second switching period belong to a 3D image for display in the second switching period.

In some embodiments, the plurality of time sequence instructions that belong to the first switching period include a first time sequence instruction and a second time sequence instruction.

That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes:

The multi-focus image generation unit receives the first time sequence instruction and generates a corresponding first 3D image block at a first distance based on the first time sequence instruction; and receives the second time sequence instruction and generates a corresponding second 3D image block at a second distance based on the second time sequence instruction.

The first 3D image block and the second 3D image block respectively have different depth information, and the first 3D image block and the second 3D image block belong to the 3D image for display in the first switching period.

In some embodiments, the multi-focus image generation unit includes a fixed-focus assembly.

That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes:

The fixed-focus assembly receives the plurality of time sequence instructions that belong to the first switching period from the time sequence control unit; and changes a distance from an object to the fixed-focus assembly for a plurality of times based on the plurality of time sequence instructions that belong to the first switching period, and generates a plurality of corresponding 3D image blocks when changing the distance from the object to the fixed-focus assembly for a plurality of times.

In some embodiments, the multi-focus image generation unit includes a zoom assembly.

That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes:

The zoom assembly receives the plurality of time sequence instructions that belong to the first switching period from the time sequence control unit; and changes a focal length of the zoom assembly for a plurality of times based on the plurality of time sequence instructions that belong to the first switching period, and generates a plurality of corresponding 3D image blocks when changing the focal length of the zoom assembly for a plurality of times.

In some embodiments, the multi-focus image generation unit includes a spatial light modulator.

That the multi-focus image generation unit receives the plurality of time sequence instructions that belong to the second switching period from the time sequence control unit, and generates a plurality of corresponding 3D image blocks at different distances based on the plurality of time sequence instructions that belong to the second switching period includes:

The spatial light modulator receives the plurality of time sequence instructions that belong to the first switching period from the time sequence control unit; and loads different spatial phase information for a plurality of times based on the plurality of time sequence instructions that belong to the first switching period, and generates a plurality of corresponding 3D image blocks when loading the different spatial phase information for a plurality of times.

In some embodiments, the naked-eye 3D display method further includes:

A diffuser screen receives the plurality of time sequence instructions that belong to the first switching period from the time sequence control unit, and receives the plurality of 3D image blocks that belong to the first switching period from the multi-focus image generation unit; and displays the 3D image in the first switching period based on the plurality of time sequence instructions that belong to the first switching period and the depth information respectively corresponding to the plurality of 3D image blocks that belong to the first switching period.

The diffuser screen is separately connected to the multi-focus image generation unit and the time sequence control unit.

In some embodiments, the diffuser screen includes a plurality of layers of diffuser sub-screens.

The displaying the 3D image in the first switching period based on the plurality of time sequence instructions that belong to the first switching period and the depth information respectively corresponding to the plurality of 3D image blocks that belong to the first switching period includes:

The plurality of layers of diffuser sub-screens determine a diffuser sub-screen currently used for display from the plurality of layers of diffuser sub-screens based on a current time sequence instruction in the plurality of time sequence instructions that belong to the first switching period, and display a 3D image block corresponding to the current time sequence instruction by using the diffuser sub-screen currently used for display.

In some embodiments, the displaying the 3D image in the first switching period based on the plurality of time sequence instructions that belong to the first switching period and the depth information respectively corresponding to the plurality of 3D image blocks that belong to the first switching period includes:

The diffuser screen determines a current position of the diffuser screen based on a current time sequence instruction in the plurality of time sequence instructions that belong to the first switching period, and displays a 3D image block corresponding to the current time sequence instruction at the current position.

In some embodiments, the naked-eye 3D display method further includes:

An imaging unit receives an optical signal transmitted by the diffuser screen, where the optical signal includes the 3D image for display in the first switching period; and generates a virtual 3D image based on the optical signal, and sends the virtual 3D image.

In some embodiments, the naked-eye 3D display method further includes:

A combiner receives the virtual 3D image sent by the imaging unit; and combines the virtual 3D image with an image of a real object.

In some embodiments, the naked-eye 3D display method further includes:

A reflector receives the virtual 3D image sent by the imaging unit; and reflects the virtual 3D image.

It may be learned from the description of the foregoing examples that the multi-focus image generation unit may be connected to the time sequence control unit. The time sequence control unit generates a plurality of time sequence instructions that belong to the first switching period, and sends the plurality of time sequence instructions that belong to the first switching period. The multi-focus image generation unit receives the plurality of time sequence instructions that belong to the first switching period from the time sequence control unit, and generates a plurality of corresponding 3D image blocks at different distances based on the plurality of time sequence instructions, where the plurality of 3D image blocks respectively have different depth information, and the plurality of 3D image blocks belong to the 3D image for display in the first switching period. The naked-eye 3D display apparatus provided in this embodiment of this application includes the multi-focus image generation unit, where the multi-focus image generation unit may generate a plurality of 3D image blocks with depth information based on time sequence control. Therefore, a 3D image formed by the apparatus has real depth distribution, and a display effect of the 3D image is better than that of a 3D technology based on 2D binocular parallax. In addition, in this embodiment of this application, the 3D image block is generated by the apparatus only based on time sequence control, and a resolution of an image source is not reduced. Therefore, a resolution of the 3D image is better than an image resolution of the 3D technology based on 2D binocular parallax.

It should be noted that, for brief description, the foregoing method embodiments are represented as a series of actions. However, a person skilled in the art should appreciate that this application is not limited to the described order of the actions, because according to this disclosure, some steps may be performed in other orders or simultaneously. It should be further appreciated by a person skilled in the art that embodiments described in this specification all belong to example embodiments, and the involved actions and modules are not necessarily required.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments, connection relationships between modules indicate that the modules have communication connections with each other, which may be implemented as one or more communication buses or signal cables.

Based on the descriptions of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this disclosure, software program implementation is a better implementation in most cases. The technical solutions in this disclosure essentially or the part contributing to the conventional technology may be implemented in a form of a software product that may be stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this disclosure.

All or some of the foregoing embodiments may be implemented by using software, hardware, firmware, or any combination thereof. When software is used to implement embodiments, embodiments may be implemented completely or partially in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A display apparatus, comprising:
   a multi-focus image generator; and
   a time sequence controller, wherein the multi-focus image generator is connected to the time sequence controller;
   wherein the time sequence controller is configured to:
      generate a plurality of time sequence instructions that belong to a first switching period; and
      send the plurality of time sequence instructions to the multi-focus image generator; and
   wherein the multi-focus image generator is configured to:
      receive the plurality of time sequence instructions that belong to the first switching period;
      load different spatial phase information for a plurality of times based on the plurality of time sequence instructions that belong to the first switching period;
      generate a plurality of three-dimensional (3D) image blocks at different distances based on the plurality of time sequence instructions by loading the different spatial phase information for the plurality of times, wherein each 3D image block of the plurality of 3D image blocks corresponds to a 3D image and includes different depth information; and
      display the 3D image in the first switching period.

2. The display apparatus according to claim 1, wherein the time sequence controller is further configured to;
   generate a plurality of time sequence instructions that belong to a second switching period; and
   send to the multi-focus image generator the plurality of time sequence instructions that belong to the second switching period; and
   wherein the multi-focus image generator is further configured to:
      receive from the time sequence controller the plurality of time sequence instructions that belong to the second switching period;

generate a second plurality of 3D image blocks at different distances based on the plurality of time sequence instructions that belong to the second switching period, wherein each 3D image block of the second plurality of 3D image blocks corresponds to a second 3D image and includes different depth information; and
      display the second 3D image in the second switching period.

3. The display apparatus according to claim 1,
   wherein the plurality of time sequence instructions that belong to the first switching period comprises a first time sequence instruction and a second time sequence instruction; and
   wherein the multi-focus image generator is further configured to;
      receive the first time sequence instruction, and generate a corresponding first 3D image block at a first distance based on the first time sequence instruction; and
      receive the second time sequence instruction, and generate a corresponding second 3D image block at a second distance based on the second time sequence instruction, wherein the first 3D image block and the second 3D image block have different depth information and belong to the 3D image for display in the first switching period.

4. The display apparatus according to claim 1, wherein the multi-focus image generator comprises a fixed-focus assembly configured to:
   receive the plurality of time sequence instructions that belong to the first switching period from the time sequence controller;
   change a distance from an object to the fixed-focus assembly for a plurality of times based on the plurality of time sequence instructions that belong to the first switching period; and
   generate the plurality of 3D image blocks when changing the distance from the object to the fixed-focus assembly for the plurality of times.

5. The display apparatus according to claim 1, wherein the multi-focus image generator comprises a zoom assembly configured to:
   receive the plurality of time sequence instructions that belong to the first switching period from the time sequence controller;
   change a focal length of the zoom assembly for a plurality of times based on the plurality of time sequence instructions that belong to the first switching period; and
   generate the plurality of 3D image blocks when changing the focal length of the zoom assembly for the plurality of times.

6. The display apparatus according to claim 1, further comprising:
   a diffuser screen separately connected to the multi-focus image generator and the time sequence controller, wherein the diffuser screen is configured to:
      receive from the time sequence controller the plurality of time sequence instructions that belong to the first switching period;
      receive from the multi-focus image generator the plurality of 3D image blocks that belong to the first switching period; and
      display the 3D image in the first switching period based on the plurality of time sequence instructions that belong to the first switching period and the depth information respectively corresponding to the plurality of 3D image blocks that belong to the first switching period.

7. The display apparatus according to claim 6, wherein the diffuser screen comprises a plurality of layers of diffuser sub-screens, wherein the plurality of layers of diffuser sub-screens is configured to:

determine a diffuser sub-screen currently used for display from the plurality of layers of diffuser sub-screens based on a current time sequence instruction in the plurality of time sequence instructions that belong to the first switching period; and display a 3D image block corresponding to the current time sequence instruction by using the diffuser sub-screen currently used for display.

8. The display apparatus according to claim 6, wherein the diffuser screen is further configured to:

determine a current position of the diffuser screen based on a current time sequence instruction in the plurality of time sequence instructions that belong to the first switching period; and display a 3D image block corresponding to the current time sequence instruction at the current position.

9. The display apparatus according to claim 6, further comprising an imager configured to:

receive an optical signal transmitted by the diffuser screen, wherein the optical signal comprises the 3D image for display in the first switching period;

generate a virtual 3D image based on the optical signal; and send the virtual 3D image.

10. A display method, comprising:

generating, by a time sequence controller, a plurality of time sequence instructions that belong to a first switching period;

sending, by the time sequence controller, the plurality of time sequence instructions to a multi-focus image generator;

receiving, by the multi-focus image generator from the time sequence controller, the plurality of time sequence instructions that belong to the first switching period;

loading, by the multi-focus image generator, different spatial phase information for a plurality of times based on the plurality of time sequence instructions that belong to the first switching period;

generating, by the multi-focus image generator, a plurality of three-dimensional (3D) image blocks at different distances based on the plurality of time sequence instructions by loading the different spatial phase information for the plurality of times, wherein each 3D image block of the plurality of 3D image blocks corresponds to a 3D image and includes different depth information; and displaying, by the multi-focus image generator, the 3D image in the first switching period.

11. The display method according to claim 10, further comprising:

generating, by the time sequence controller, a plurality of time sequence instructions that belong to a second switching period;

sending, by the time sequence controller to the multi-focus image generator, the plurality of time sequence instructions that belong to the second switching period;

receiving, by the multi-focus image generator from the time sequence controller, the plurality of time sequence instructions that belong to the second switching period;

generating, by the multi-focus image generator, a second plurality of 3D image blocks at different distances based on the plurality of time sequence instructions that belong to the second switching period, wherein each 3D image block of the second plurality of 3D image blocks corresponds to a second 3D image and includes different depth information; and displaying, by the multi-focus image generator, the second 3D image in the second switching period.

12. The display method according to claim 10, wherein the plurality of time sequence instructions that belong to the first switching period comprises a first time sequence instruction and a second time sequence instruction; and wherein the display method further comprises:

receiving, by the multi-focus image generator, the first time sequence instruction, and generating, by the multi-focus image generator, a corresponding first 3D image block at a first distance based on the first time sequence instruction; and receiving, by the multi-focus image generator, the second time sequence instruction, and generating, by the multi-focus image generator, a corresponding second 3D image block at a second distance based on the second time sequence instruction, wherein the first 3D image block and the second 3D image block belong to the 3D image and include different depth information for display in the first switching period.

13. The display method according to claim 10, wherein the multi-focus image generator comprises a fixed-focus assembly; and wherein the display method further comprises:

receiving, by the fixed-focus assembly from the time sequence controller, the plurality of time sequence instructions that belong to the first switching period;

changing, by the fixed-focus assembly, a distance from an object to the fixed-focus assembly for a plurality of times based on the plurality of time sequence instructions that belong to the first switching period; and generating, by the fixed-focus assembly, the plurality of 3D image blocks when changing the distance from the object to the fixed-focus assembly for the plurality of times.

14. The display method according to claim 10, wherein the multi-focus image generator comprises a zoom assembly; and wherein the display method further comprises:

receiving, by the zoom assembly from the time sequence controller, the plurality of time sequence instructions that belong to the first switching period;

changing, by the zoom assembly, a focal length of the zoom assembly for a plurality of times based on the plurality of time sequence instructions that belong to the first switching period, and generating, by the zoom assembly, the plurality of 3D image blocks when changing the focal length of the zoom assembly for the plurality of times.

15. The display method according to claim 10, wherein the display method further comprises:

receiving, by a diffuser screen from the time sequence controller, the plurality of time sequence instructions that belong to the first switching period;

receiving, by the diffuser screen, the plurality of 3D image blocks that belong to the first switching period from the multi-focus image generator; and

displaying, by the diffuser screen, the 3D image in the first switching period based on the plurality of time sequence instructions that belong to the first switching period and the depth information respectively corresponding to the plurality of 3D image blocks that belong to the first switching period;

wherein the diffuser screen is separately connected to the multi-focus image generator and the time sequence controller.

16. The display method according to claim 15, wherein the diffuser screen comprises a plurality of layers of diffuser sub-screens; and wherein the display method further comprises:

determining, by the plurality of layers of diffuser sub-screens, a diffuser sub-screen currently used for display from the plurality of layers of diffuser sub-screens based on a current time sequence instruction in the plurality of time sequence instructions that belong to the first switching period; and displaying, by the plurality of layers of diffuser sub-screens, a 3D image block corresponding to the current time sequence instruction by using the diffuser sub-screen currently used for display.

17. The display method according to claim 15, wherein the display method further comprises:

determining, by the diffuser screen, a current position of the diffuser screen based on a current time sequence instruction in the plurality of time sequence instructions that belong to the first switching period; and displaying, by the diffuser screen, a 3D image block corresponding to the current time sequence instruction at the current position.

18. The display method according to claim 15, wherein the display method further comprises:

receiving, by an imager, an optical signal transmitted by the diffuser screen, wherein the optical signal comprises the 3D image for display in the first switching period;

generating, by the imager, a virtual 3D image based on the optical signal; and sending, by the imager, the virtual 3D image.

19. An automobile, comprising a display apparatus that includes:

a multi-focus image generator and a time sequence controller, wherein the multi-focus image generator is connected to the time sequence controller;

wherein the time sequence controller is configured to:

generate a plurality of time sequence instructions that belong to a first switching period; and send, to the multi-focus image generator, the plurality of time sequence instructions that belong to the first switching period; and wherein the multi-focus image generator is configured to:

receive the plurality of time sequence instructions that belong to the first switching period from the time sequence controller;

load different spatial phase information for a plurality of times based on the plurality of time sequence instructions that belong to the first switching period;

generate a plurality of three-dimensional (3D) image blocks at different distances based on the plurality of time sequence instructions by loading the different spatial phase information for the plurality of times, wherein each 3D image block of the plurality of 3D image blocks corresponds to a 3D image and includes different depth information; and display the 3D image in the first switching period.

20. The automobile according to claim 19, wherein the time sequence controller is further configured to:

generate a plurality of time sequence instructions that belong to a second switching period; and send, to the multi-focus image generator, the plurality of time sequence instructions that belong to the second switching period; and wherein the multi-focus image generator is configured to:

receive the plurality of time sequence instructions that belong to the second switching period from the time sequence controller;

generate a second plurality of 3D image blocks at different distances based on the plurality of time sequence instructions that belong to the second switching period, wherein each 3D image block of the second plurality of 3D image blocks corresponds to a second 3D image and includes different depth information; and display the second 3D image in the second switching period.

21. The automobile according to claim 19, wherein the plurality of time sequence instructions that belong to the first switching period comprises a first time sequence instruction and a second time sequence instruction;

wherein the multi-focus image generator is configured to:

receive the first time sequence instruction, and generate a corresponding first 3D image block at a first distance based on the first time sequence instruction; and receive the second time sequence instruction, and generate a corresponding second 3D image block at a second distance based on the second time sequence instruction, wherein the first 3D image block and the second 3D image block have different depth information, and the first 3D image block and the second 3D image block belong to the 3D image for display in the first switching period.

22. The automobile according to claim 19, wherein the display apparatus comprises a diffuser screen separately connected to the multi-focus image generator and the time sequence controller, and the diffuser screen is configured to:

receive the plurality of time sequence instructions that belong to the first switching period from the time sequence controller;

receive the plurality of 3D image blocks that belong to the first switching period from the multi-focus image generator; and display the 3D image in the first switching period based on the plurality of time sequence instructions that belong to the first switching period and the depth information respectively corresponding to the plurality of 3D image blocks that belong to the first switching period.

23. The automobile according to claim 22, wherein the diffuser screen comprises a plurality of layers of diffuser sub-screens, and the plurality of layers of diffuser sub-screens is configured to:

determine a diffuser sub-screen currently used for display from the plurality of layers of diffuser sub-screens based on a current time sequence instruction in the plurality of time sequence instructions that belong to the first switching period; and display a 3D image block corresponding to the current time sequence instruction by using the diffuser sub-screen currently used for display.

24. The automobile according to claim 22, wherein the diffuser screen is further configured to:

determine a current position of the diffuser screen based on a current time sequence instruction in the plurality of time sequence instructions that belong to the first switching period; and display a 3D image block corresponding to the current time sequence instruction at the current position.

\* \* \* \* \*